United States Patent
Kasai et al.

(10) Patent No.: US 9,585,196 B2
(45) Date of Patent: Feb. 28, 2017

(54) HONEYCOMB STRUCTURE

(71) Applicant: NGK INSULATORS, LTD., Nagoya (JP)

(72) Inventors: Yoshiyuki Kasai, Nagoya (JP); Atsushi Kaneda, Nagoya (JP); Yusuke Hosoi, Nagoya (JP); Yoshimasa Omiya, Nagoya (JP); Tadato Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 804 days.

(21) Appl. No.: 13/923,931

(22) Filed: Jun. 21, 2013

(65) Prior Publication Data
US 2013/0284720 A1    Oct. 31, 2013

Related U.S. Application Data

(63) Continuation of application No. PCT/JP2011/079936, filed on Dec. 22, 2011.

(30) Foreign Application Priority Data

Dec. 24, 2010   (JP) ................................. 2010-288670

(51) Int. Cl.
*H05B 3/03*   (2006.01)
*F01N 3/20*   (2006.01)
(Continued)

(52) U.S. Cl.
CPC ................ *H05B 3/03* (2013.01); *B01J 35/04* (2013.01); *F01N 3/2026* (2013.01);
(Continued)

(58) Field of Classification Search
CPC ..... B01J 35/0033; B01J 35/04; F01N 3/2026; F01N 3/2828; H05B 2203/024;
(Continued)

(56) References Cited

U.S. PATENT DOCUMENTS 5,063,029 A   11/1991   Mizuno et al.
5,158,654 A   10/1992   Yoshimoto et al.
(Continued)

FOREIGN PATENT DOCUMENTS

CN   1517523 A   8/2004
CN   1834417 A   9/2006
(Continued)

OTHER PUBLICATIONS

Chinese Office Action (Application No. 201180062463.5) dated Jul. 22, 2014.
(Continued)

*Primary Examiner* — Dana Ross
*Assistant Examiner* — Joseph Iskra
(74) *Attorney, Agent, or Firm* — Burr & Brown, PLLC

(57) ABSTRACT

A honeycomb structure including: a tubular honeycomb structure part having porous partition walls with which a plurality of cells are formed, and an outer peripheral wall; and a pair of electrode parts arranged on a side surface of the honeycomb structure part, an electrical resistivity of the honeycomb structure part is from 1 to 200 Ωcm, each of the pair of electrode parts is formed into a band-like shape extending in a direction in which the cells extend, in a cross section perpendicular to the extending direction of the cells, the one electrode part is disposed opposite to the other electrode part via the center of the honeycomb structure part, and a total of heat capacities of the pair of electrode parts is from 2 to 150% of a heat capacity of the whole outer peripheral wall.

14 Claims, 6 Drawing Sheets

(51) Int. Cl.
*F01N 3/28* (2006.01)
*H05B 3/14* (2006.01)
*H05B 3/42* (2006.01)
*B01J 35/04* (2006.01)
*B01J 35/00* (2006.01)

(52) U.S. Cl.
CPC ............ *F01N 3/2828* (2013.01); *H05B 3/141* (2013.01); *H05B 3/42* (2013.01); *B01J 35/0033* (2013.01); *H05B 2203/024* (2013.01); *Y02T 10/26* (2013.01)

(58) Field of Classification Search
CPC .. H05B 3/03; H05B 3/141; H05B 3/42; Y02T 10/26; Y10T 428/24149; C04B 38/0006; C04B 38/0009
USPC ............... 422/173, 174, 175, 177, 179, 180; 219/205, 541, 542, 552, 553; 428/116, 428/117, 593; 60/300
See application file for complete search history.

(56) References Cited

U.S. PATENT DOCUMENTS

| | | | |
|---|---|---|---|
| 5,160,586 A | 11/1992 | Yoshimoto et al. | |
| 5,232,882 A | 8/1993 | Yoshimoto et al. | |
| 5,266,278 A * | 11/1993 | Harada | F01N 3/2026 219/541 |
| 5,288,975 A | 2/1994 | Kondo | |
| RE35,134 E | 12/1995 | Mizuno et al. | |
| 5,758,498 A | 6/1998 | Fukui | |
| 6,097,011 A * | 8/2000 | Gadkaree | B01D 53/02 219/202 |
| 2003/0134084 A1 | 7/2003 | Ichikawa et al. | |
| 2004/0141890 A1 | 7/2004 | Hirata et al. | |
| 2005/0229564 A1 | 10/2005 | Okubo et al. | |
| 2006/0207428 A1 | 9/2006 | Ibe et al. | |
| 2008/0072574 A1 * | 3/2008 | Masuda | B01D 53/32 60/275 |
| 2008/0229931 A1 | 9/2008 | Katsuyama et al. | |
| 2012/0076698 A1 * | 3/2012 | Ishihara | B01D 53/00 422/174 |
| 2012/0187109 A1 | 7/2012 | Noguchi et al. | |
| 2013/0043236 A1 | 2/2013 | Sakashita et al. | |

FOREIGN PATENT DOCUMENTS

| | | |
|---|---|---|
| CN | 101321934 A | 12/2008 |
| JP | 02-307511 A1 | 12/1990 |
| JP | 04-341787 A1 | 11/1992 |
| JP | 06-081638 A1 | 3/1994 |
| JP | 08-141408 A1 | 6/1996 |
| JP | 2931362 B2 | 8/1999 |
| JP | 2000-128637 A1 | 5/2000 |
| JP | 2001-252573 A1 | 9/2001 |
| JP | 4136319 B2 | 8/2008 |
| JP | 2010-229978 A1 | 10/2010 |
| JP | 2011-212577 A1 | 10/2011 |
| WO | 2011/043434 A1 | 4/2011 |
| WO | 2011/125815 A1 | 10/2011 |

OTHER PUBLICATIONS

U.S. Appl. No. 14/018,710, filed Sep. 5, 2013, Hosoi et al.
U.S. Appl. No. 13/628,521, filed Sep. 27, 2012, Sakashita et al.
U.S. Appl. No. 13/628,672, filed Sep. 27, 2012, Sakashita et al.
International Search Report and Written Opinion dated Feb. 7, 2012.

* cited by examiner

HONEYCOMB STRUCTURE

BACKGROUND OF THE INVENTION

1. Field of the Invention

The present invention relates to a honeycomb structure, and more particularly, it relates to a honeycomb structure which is a catalyst support and also functions as a heater when a voltage is applied thereto and which has an excellent heat shock resistance.

2. Description of Related Art

Heretofore, a honeycomb structure made of cordierite, onto which a catalyst is loaded, has been used in treatment of harmful substances in an exhaust gas discharged from a car engine. Moreover, it is also known that a honeycomb structure formed by a sintered silicon carbide body has been used in purification of the exhaust gas (see, e.g., Patent Document 1).

When the exhaust gas is treated by the catalyst loaded onto the honeycomb structure, a temperature of the catalyst needs to be raised up to a predetermined temperature. However, the catalyst temperature is low at the start of the engine, which has caused the problem that the exhaust gas is not sufficiently purified.

To solve the problem, a method has been investigated in which a heater made of a metal is disposed on an upstream side of a honeycomb structure onto which a catalyst is loaded, to raise a temperature of an exhaust gas (see, e.g., Patent Document 2).

Moreover, it has been disclosed that a honeycomb structure made of a conductive ceramic material and including both end portions provided with electrodes is used as a catalyst support with a heater (see, e.g., Patent Document 3).

PRIOR ART DOCUMENTS

Patent Documents

Patent Document 1: JP 4136319
Patent Document 2: JP 2931362
Patent Document 3: JP-A-8-141408

SUMMARY OF THE INVENTION

When the above-mentioned metal heater is mounted on a car and used, a power source for use in an electric system of the car is used in common. Therefore, for example, the power source of a high voltage of 200 V is used. However, in the metal heater, an electric resistance is low. In consequence, there has been the problem that a current excessively flows, and a power source circuit is damaged sometimes, when the above high-voltage power source is used.

Furthermore, when the heater is made of the metal, the catalyst is not easily loaded onto the heater even if the heater is processed into a honeycomb constitution. Therefore, it has been difficult to integrally dispose the heater and the catalyst.

Additionally, in a catalyst support with a heater in which electrodes are arranged in both end portions of a honeycomb structure made of a conductive ceramic material, the electrodes easily deteriorate, and a resistance value increases sometimes. This is because the electrodes are directly exposed to an exhaust gas, when the catalyst support with the heater is mounted on a car and used.

The present invention has been developed in view of the above-mentioned problems, and an object thereof is to provide a honeycomb structure which is a catalyst support and also functions as a heater when a voltage is applied thereto and which has an excellent heat shock resistance.

To achieve the above-mentioned object, according to the present invention, the following honeycomb structure is provided.

According to a first aspect of the present invention, a honeycomb structure including: a tubular honeycomb structure part having porous partition walls with which a plurality of cells extending from one end surface to the other end surface are formed to become through channels of a fluid is provided, and an outer peripheral wall positioned on an outermost periphery; and a pair of electrode parts arranged on a side surface of the honeycomb structure part, wherein an electrical resistivity of the honeycomb structure part is from 1 to 200 $\Omega$cm, each of the pair of electrode parts is formed into a band-like shape extending in a direction in which the cells of the honeycomb structure part extend, in a cross section perpendicular to the cell extending direction, the one electrode part in the pair of electrode parts is disposed opposite to the other electrode part in the pair of electrode parts via the center of the honeycomb structure part, and a total of heat capacities of the pair of electrode parts is from 2 to 150% of a heat capacity of the whole outer peripheral wall.

According to a second aspect of the present invention, the honeycomb structure according to the above first aspect is provided, wherein the total of the heat capacities of the pair of electrode parts is from 2 to 80% of the heat capacity of the whole outer peripheral wall.

According to a third aspect of the present invention, the honeycomb structure according to the above first or second aspects is provided, wherein a thickness of each of the pair of electrode parts is from 0.025 to 1.0 mm.

According to a fourth aspect of the present invention, the honeycomb structure according to the above first or second aspects is provided, wherein a porosity of each of the pair of electrode parts is from 30 to 80%.

According a fifth aspect of the present invention, the honeycomb structure according to any one of the above first to fourth aspects is provided, wherein an electrical resistivity of the electrode part is from 0.01 to 100 $\Omega$cm.

According to a sixth aspect of the present invention, the honeycomb structure according to any one of the above first to fifth aspects is provided, wherein a conductor having an electrical resistivity lower than that of the electrode part is disposed on the surface of the electrode part.

In the honeycomb structure of the present invention, the electrical resistivity of the honeycomb structure part is from 1 to 200 $\Omega$cm. Therefore, even when a current is allowed to flow by using a high-voltage power source, the current does not excessively flow, so that the honeycomb structure can suitably be used as a heater. Moreover, in the honeycomb structure of the present invention, each of the pair of electrode parts is formed into the band-like shape extending in the direction in which the cells of the honeycomb structure part extend. Furthermore, in the cross section of the honeycomb structure of the present invention which is perpendicular to the cell extending direction, the one electrode part in the pair of electrode parts is disposed opposite to the other electrode part in the pair of electrode parts via the center of the honeycomb structure part. Therefore, in the honeycomb structure of the present invention, it is possible to suppress a deviation of a temperature distribution when the voltage is applied. Furthermore, in the honeycomb structure of the present invention, the total of the heat capacities of the pair of electrode parts is from 2 to 150% of the heat capacity of the whole outer peripheral wall. Therefore, in the honeycomb structure of the present invention, it is possible to suppress generation of a large stress in the honeycomb structure part, even when a rapid temperature change takes place in a case where the honeycomb structure is mounted on an exhaust system of an internal combustion engine and used. In consequence, it is possible to suppress generation of cracks in the honeycomb structure.

DETAILED DESCRIPTION OF THE INVENTION

Next, a mode for carrying out the present invention will be described in detail with reference to the drawings, but it should be understood that the present invention is not limited to the following embodiments and that design modifications, improvements and the like are suitably added on the basis of ordinary knowledge of a person skilled in the art without departing from the gist of the present invention.

Figure 1:
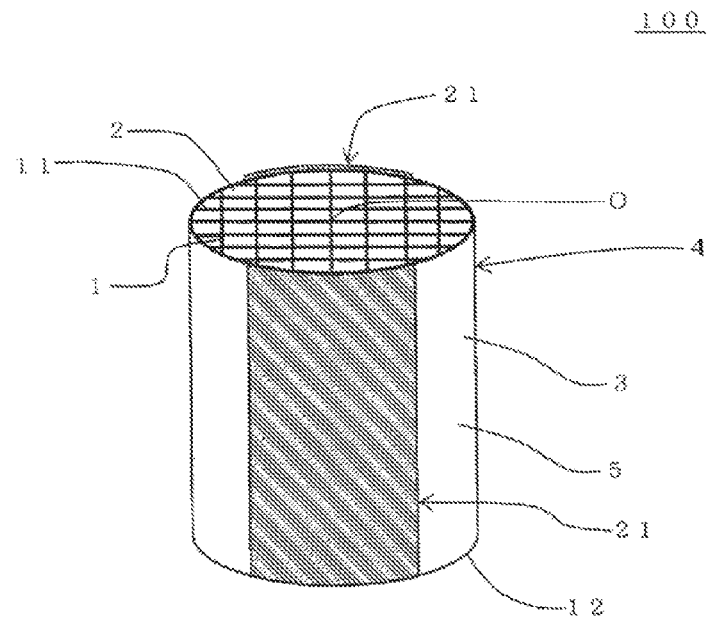
FIG. 1 is a perspective view schematically showing one embodiment of a honeycomb structure of the present invention.
Figure 2:
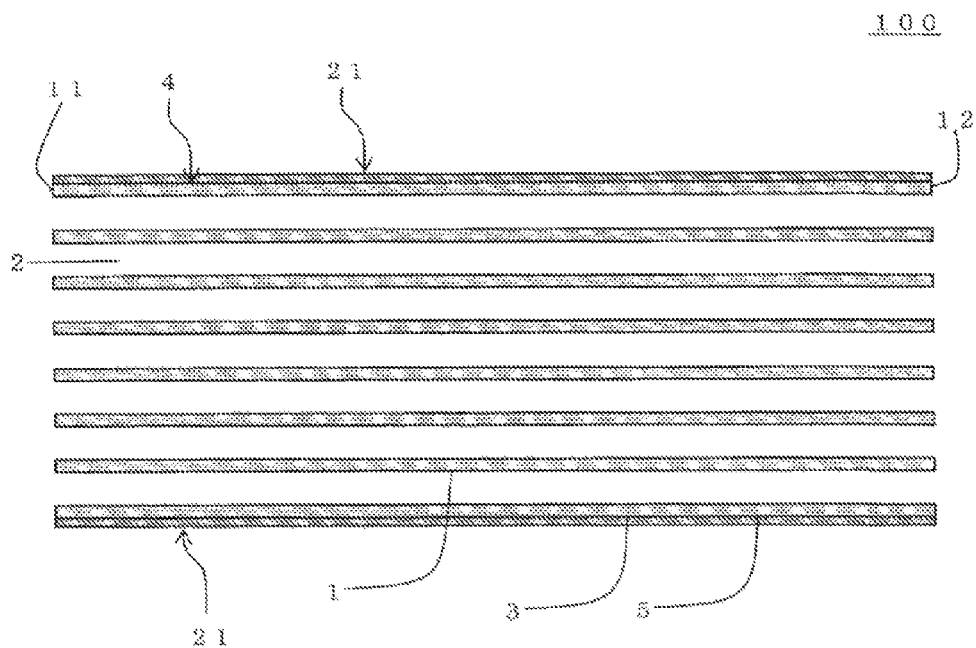
FIG. 2 is a schematic view showing a cross section of the one embodiment of the honeycomb structure of the present invention which is parallel to a cell extending direction.
Figure 3:
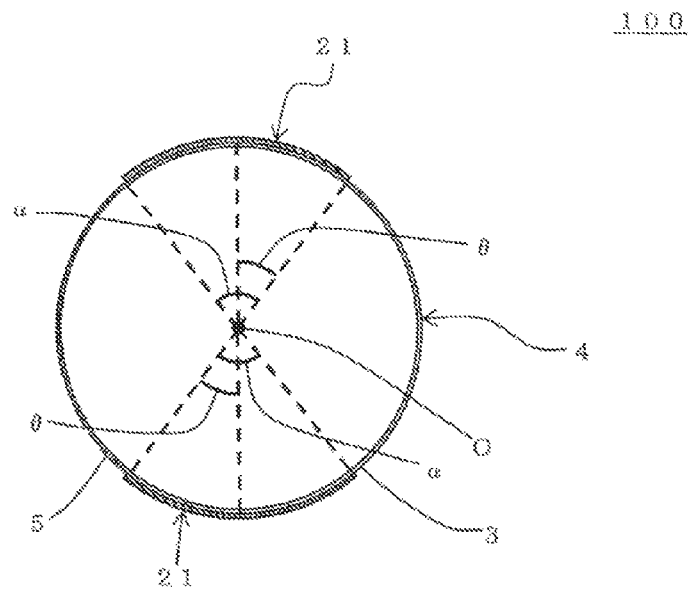
FIG. 3 is a schematic view showing a cross section of the one embodiment of the honeycomb structure of the present invention which is perpendicular to the cell extending direction.

(1) Honeycomb Structure:

One embodiment of a honeycomb structure of the present invention includes a tubular honeycomb structure part 4 having porous partition walls 1 and an outer peripheral wall 3 positioned on an outermost periphery, and a pair of electrode parts 21 and 21 arranged on a side surface 5 of the honeycomb structure part 4, as in a honeycomb structure 100 shown in FIG. 1 to FIG. 3. With the partition walls 1, a plurality of cells 2 "extending from one end surface 11 to the other end surface 12" are formed "to become through channels of a fluid". In the honeycomb structure 100, an electrical resistivity of the honeycomb structure part 4 is from 1 to 200 Ωcm. Each of the pair of electrode parts 21 and 21 of the honeycomb structure 100 is formed into a band-like shape extending in a direction in which the cells 2 of the honeycomb structure part 4 extend. Moreover, in a cross section of the honeycomb structure 100 which is perpendicular to the extending direction of the cells 2, the one electrode part 21 in the pair of electrode parts 21 and 21 is disposed opposite to the other electrode part 21 in the pair of electrode parts 21 and 21 via a center O of the honeycomb structure part 4. Furthermore, in the honeycomb structure 100, a total of heat capacities of the pair of electrode parts 21 and 21 is from 2 to 150% of a heat capacity of the whole outer peripheral wall 3. FIG. 1 is a perspective view schematically showing the one embodiment of the honeycomb structure of the present invention. FIG. 2 is a schematic view showing a cross section of the one embodiment of the honeycomb structure of the present invention which is parallel to the cell extending direction. FIG. 3 is a schematic view showing a cross section of the one embodiment of the honeycomb structure of the present invention which is perpendicular to the cell extending direction. It is to be noted that in FIG. 3, the partition walls are omitted.

As described above, in the honeycomb structure 100 of the present embodiment, the electrical resistivity of the honeycomb structure part 4 is from 1 to 200 Ωcm. Therefore, even when a current is allowed to flow by use of a high-voltage power source, the current does not excessively flow, so that the honeycomb structure can suitably be used as a heater. Moreover, in the honeycomb structure 100, each of the pair of electrode parts 21 and 21 is formed into the band-like shape, and the one electrode part 21 is disposed opposite to the other electrode part 21 via the center of the honeycomb structure part 4. Therefore, it is possible to suppress a deviation of a temperature distribution of the honeycomb structure part 4, when a voltage is applied between the pair of electrode parts 21 and 21. Furthermore, in the honeycomb structure 100, the total of the heat capacities of the pair of electrode parts 21 and 21 is from 2 to 150% of the heat capacity of the whole outer peripheral wall 3. In consequence, it is possible to suppress generation of a large stress in the honeycomb structure part 4, when rapid heating and rapid cooling take place.

It is to be noted that a constitution where "in the cross section perpendicular to the extending direction of the cells 2, the one electrode part 21 in the pair of electrode parts 21 and 21 is disposed opposite to the other electrode part 21 in the pair of electrode parts 21 and 21 via the center O of the honeycomb structure part 4" is defined as follows. That is, it is meant that the pair of electrode parts 21 and 21 are arranged in the honeycomb structure part 4 so as to satisfy a positional relation in which an angle $\beta$ formed between a line segment (A) and a line segment (B) is in a range of 170 to 190' in the cross section perpendicular to the extending direction of the cells 2. The above line segment (A) is a line segment connecting a center point of the one electrode part 21 (the center point in "a peripheral direction of the honeycomb structure part 4") to the center O of the honeycomb structure part 4. The above line segment (B) is a line segment connecting a center point of the other electrode part 21 (the center point in "the peripheral direction of the honeycomb structure part 4") to the center O of the honeycomb structure part 4. The angle $\beta$ is an angle around "the center O".

In the honeycomb structure 100 of the present embodiment, a material of the partition walls 1 and the outer peripheral wall 3 preferably contains a silicon-silicon carbide composite material or a silicon carbide material as a main component, and the material is further preferably the silicon-silicon carbide composite material or the silicon carbide material. When "the material of the partition walls 1 and the outer peripheral wall 3 contains the silicon-silicon carbide composite material or the silicon carbide material as the main component", it is meant that the partition walls 1 and the outer peripheral wall 3 contain 90 mass % or more of the silicon-silicon carbide composite material or the silicon carbide material in the whole material. By the use of such a material, the electrical resistivity of the honeycomb structure part can be from 1 to 200 Ωcm. Here, the silicon-silicon carbide composite material contains silicon carbide particles as aggregates, and silicon as a binding agent to bind the silicon carbide particles. The plurality of silicon carbide particles are preferably bound by silicon so as to form pores among the silicon carbide particles. Moreover, the silicon carbide material is obtained by mutually sintering the silicon carbide particles. The electrical resistivity of the honeycomb structure part is a value at 400° C.

As shown in FIG. 1 to FIG. 3, in the honeycomb structure 100 of the present embodiment, the side surface 5 of the honeycomb structure part 4 (the surface of the outer peripheral wall 3) is provided with the pair of electrode parts 21 and 21. In the honeycomb structure 100 of the present embodiment, the voltage is applied between the pair of electrode parts 21 and 21, thereby generating heat. The voltage to be applied is preferably from 12 to 900 V, and further preferably from 64 to 600 V.

As shown in FIG. 1 to FIG. 3, in the honeycomb structure 100 of the present embodiment, (i) each of the pair of electrode parts 21 and 21 is formed into the band-like shape extending in the direction in which the cells 2 of the honeycomb structure part 4 extend. Moreover, (ii) in the cross section perpendicular to the extending direction of the cells 2, the one electrode part 21 in the pair of electrode parts 21 and 21 is disposed opposite to the other electrode part 21 in the pair of electrode parts 21 and 21 via the center O of the honeycomb structure part 4. Further in the honeycomb structure 100 of the present embodiment, 0.5 time a center angle α is preferably from 15 to 65°, and further preferably from 30 to 60°. The center angle α is a center angle of each of the electrode parts 21 and 21 in the cross section perpendicular to the extending direction of the cells 2. 0.5 time the center angle α is an angle θ of 0.5 time the center angle α. In this way, the above (i) and the above (ii) are satisfied, and furthermore, the angle θ of 0.5 time the center angle α of each of the electrode parts 21 and 21 is from 15 to 65° in the cross section perpendicular to the extending direction of the cells 2. According to such a constitution, it is possible to more effectively suppress a deviation of the current flowing through the honeycomb structure part 4, when the voltage is applied between the pair of electrode parts 21 and 21. In other words, the current flowing through the honeycomb structure part 4 can be allowed to more evenly flow. In consequence, a deviation of the heat generation in the honeycomb structure part 4 can be suppressed. As shown in FIG. 3, "the center angle α of the electrode part 21" is an angle formed between two line segments connecting both ends of the electrode part 21 to the center O of the honeycomb structure part 4 in the cross section perpendicular to the extending direction of the cells 2. The above "angle formed between the two line segments" is an inner angle of a portion of the center O in a shape (e.g., a fan shape) formed by the electrode part 21, a line segment (a) and a line segment (b) in the cross section perpendicular to the extending direction of the cells 2. The above line segment (a) is a line segment connecting one end portion of the electrode part 21 to the center O. The above line segment (b) is a line segment connecting the other end portion of the electrode part 21 to the center O.

Moreover, "the angle θ of 0.5 time the center angle α" of the one electrode part 21 is preferably a size of 0.8 to 1.2 times "the angle θ of 0.5 time the center angle α" of the other electrode part 21, and is further preferably a size of 1.0 time (the same size). In consequence, it is possible to more effectively suppress the deviation of the current flowing through the honeycomb structure part 4, when the voltage is applied between the pair of electrode parts 21 and 21. As a result, it is possible to more effectively suppress the deviation of the heat generation in the honeycomb structure part 4.

In the honeycomb structure of the present embodiment, the electrode part 21 has, for example, a shape obtained by curving a planar rectangular member along an outer periphery of a cylindrical shape as shown in FIG. 1 to FIG. 3. Here, a shape obtained when the curved electrode part 21 is deformed into a planar member which is not curved is called "the planar shape" of the electrode part 21. The above "planar shape" of the electrode part 21 shown in FIG. 1 to FIG. 3 is a rectangular shape. Moreover, "the outer peripheral shape of the electrode part" means "the outer peripheral shape in the planar shape of the electrode part".

In the honeycomb structure of the present embodiment, as shown in FIG. 1 to FIG. 3, the outer peripheral shape of the band-like electrode part 21 may be the rectangular shape. In another preferable configuration of the honeycomb structure of the present embodiment, the outer peripheral shape of the band-like electrode part 21 is "a rectangular shape including curved corner portions". In still another preferable configuration, the outer peripheral shape of the band-like electrode part 21 is "a rectangular shape including linearly chamfered corner portions". A complex application of "a curved shape" and "a linear shape" is also preferable. That is, the outer peripheral shape of the band-like electrode part 21 is also preferably a rectangular shape including at least one corner portion having "the curved shape" and at least one corner portion having "the linearly chamfered shape". Furthermore, "the band-like shape" in the present description can be called a sheet-like shape or a film-like shape. That is, "the electrode part" in the present description does not include an outward projecting portion such as an "electrode terminal projecting portion" in the present description.

As described above, the outer peripheral shape of the electrode part 21 is "the rectangular shape including the curved corner portion" or "the rectangular shape including the linearly chamfered corner portion", and hence a heat shock resistance of the honeycomb structure can further be enhanced. When the corner portion of the electrode part is formed at right angles, a stress in the vicinity of "the corner portion of the electrode part" in the honeycomb structure part tends to be relatively higher than that of the other portions. On the other hand, when the corner portion of the electrode part is curved or linearly chamfered, it is possible to further decrease the stress in the vicinity of "the corner portion of the electrode part" in the honeycomb structure part.

Moreover, in the honeycomb structure of the present embodiment, the electrode part preferably does not have "a corner portion having "an inner angle smaller than 90°"". When the electrode part has "the corner portion having "the inner angle smaller than 90°"", a high stress is easily applied to the honeycomb structure part in the vicinity of "the corner portion having "the inner angle smaller than 90°"" of the electrode part in a case where the heat shock is given to the honeycomb structure.

In the honeycomb structure of the present invention, the side surface of the tubular honeycomb structure part is provided with the pair of electrode parts. In this way, the pair of electrode parts are arranged, thereby allowing the current to flow through the honeycomb structure part in a direction perpendicular to the cell extending direction (or a direction nearly perpendicular to the cell extending direction). In such a "constitution in which the side surface of the honeycomb structure part is provided with the electrode parts", the electrode parts are arranged on the side surface of the honeycomb structure part. Therefore, the heat accumulates in a portion of the outer peripheral wall which is provided with the electrode part, thereby easily making a temperature difference between the portion and a portion of the outer peripheral wall which is not provided with any electrode parts. Therefore, the heat shock resistance of the honeycomb structure might deteriorate.

In the honeycomb structure of the present embodiment, the total of the heat capacities of the pair of electrode parts is from 2 to 150% of the heat capacity of the whole outer peripheral wall. In such a range, an amount of the heat to be accumulated in the electrode parts decreases, and the heat shock resistance of the honeycomb structure enhances. Therefore, it is possible to suppress the generation of the large stress in the honeycomb structure part, even when the rapid temperature change takes place in the case where the honeycomb structure is mounted on an exhaust system of an internal combustion engine and used. The total of the heat capacities of the pair of electrode parts is preferably not more than the heat capacity of the whole outer peripheral wall (i.e., from 2 to 100%), and is further preferably smaller than the heat capacity of the whole outer peripheral wall. In consequence, the amount of the heat to be accumulated in the electrode parts further decreases, and the heat shock resistance of the honeycomb structure further enhances. Therefore, it is possible to further suppress the generation of the large stress in the honeycomb structure part, even when the rapid temperature change takes place in the case where the honeycomb structure is mounted on the exhaust system of the internal combustion engine and used. The total of the heat capacities of the pair of electrode parts is a value obtained by a heat capacity calculating method in which a porosity, a specific gravity of the material and specific heat are taken into consideration, on the basis of a volume of each of the electrode parts. The above "volume of the electrode part" is a volume of each of the electrode parts which is calculated by using an average thickness and electrode angle (the center angle $\alpha$ in FIG. 3) of the electrode part which are measured by an optical microscope. The heat capacity of the whole outer peripheral wall is a value obtained by the heat capacity calculating method in which the porosity, the specific gravity of the material and the specific heat are taken into consideration, on the basis of a volume of the outer peripheral wall. The above "volume of the outer peripheral wall" is a volume of the outer peripheral wall which is calculated by using an average thickness of the outer peripheral wall measured by the optical microscope. It is to be noted that in the present description, an area of a portion where the electrode part comes in contact with the side surface of the honeycomb structure part is "the contact area of the electrode part". Moreover, a cylinder which is coaxial with the honeycomb structure part and divides the electrode part is presumed, and a dividing surface of the electrode part divided by the cylinder is a virtual dividing surface. Furthermore, an area of this virtual dividing surface is "the virtual dividing area". When a boundary between the band-like electrode part and an outward projecting portion such as "the electrode terminal projecting portion" described later is not clear, "the electrode part" is a part where the above "virtual dividing area" is 90% or more of the above "contact area of the electrode part", in the calculation of "the heat capacity of the electrode part" in the present description. That is, in the above case, a part where the above "virtual dividing area" is smaller than 90% of the above "contact area of the electrode part" is not the electrode part, in the calculation of "the heat capacity of the electrode part" in the present description.

In the honeycomb structure of the present embodiment, when "the total of the heat capacities of the pair of electrode parts is smaller than the heat capacity of the whole outer peripheral wall", specifically, the total of the heat capacities of the pair of electrode parts is preferably from 2 to 80% of the heat capacity of the whole outer peripheral wall. A lower limit value is further preferably 9%, and especially preferably 15%. Moreover, an upper limit value is further preferably 75%, and especially preferably 50%. When the total of the heat capacities is smaller than 2%, the effect of "allowing the current to further evenly flow through the whole honeycomb structure part when applying the voltage" deteriorates sometimes. When the total of the heat capacities is larger than 80%, an effect of enhancing the heat shock resistance deteriorates sometimes.

In the honeycomb structure of the present embodiment, a thickness of the pair of electrode parts is preferably from 5 to 200%, further preferably from 5 to 140%, and especially preferably from 5 to 100% of a thickness of the outer peripheral wall of the honeycomb structure part. There is such a relation between the thickness of each of the electrode parts and the thickness of the outer peripheral wall of the honeycomb structure part, and hence the heat capacity of the electrode part can be lower than the heat capacity of the outer peripheral wall of the honeycomb structure part. In consequence, the heat shock resistance of the honeycomb structure can be enhanced. When the thickness of the electrode part is smaller than 5% of the thickness of the outer peripheral wall of the honeycomb structure part, it is difficult to allow the current to evenly flow through the honeycomb structure part sometimes. When the thickness of the electrode part is larger than 200% of the thickness of the outer peripheral wall of the honeycomb structure part, the heat capacity of the electrode part is not easily decreased sometimes.

The thickness of each of the electrode parts is a value measured by the optical microscope. Specifically, the value is an average thickness of three points of the electrode part in the peripheral direction in "the center portion of the honeycomb structure in the cell extending direction". "The value of the average thickness of three points of the electrode part in the peripheral direction" is defined as follows. That is, the electrode part is equally divided into three portions "in the peripheral direction of the honeycomb structure part" to form three divided portions, the thickness of the center of each divided portion "in the peripheral direction of the honeycomb structure part" is measured, and the obtained measurement results of the thicknesses of the three points are averaged. "To equally divide the electrode part into the three portions in "the peripheral direction of the honeycomb structure part"" as described above is to divide the electrode part into the three equal portions by a straight line parallel to the cell extending direction.

Figure 12:
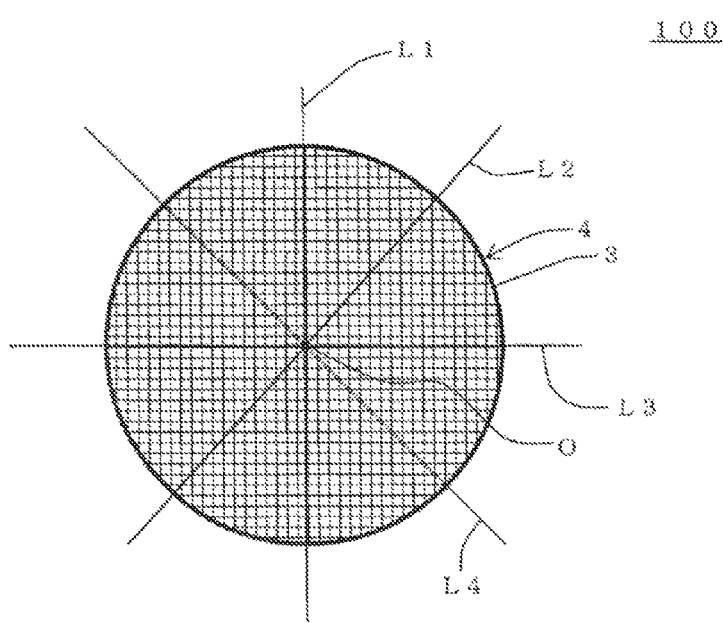
FIG. 12 is a schematic view showing a cross section of the one embodiment of the honeycomb structure of the present invention which is perpendicular to the cell extending direction.

The thickness of the outer peripheral wall of the honeycomb structure part is a value measured by the optical microscope. Specifically, the value is the average thickness of eight points of the outer peripheral wall in the peripheral direction "in the center portion of the honeycomb structure in the cell extending direction". "The eight portions of the outer peripheral wall in the peripheral direction" are defined as follows. That is, as shown in FIG. 12, four straight lines L1, L2, L3 and L4 intersect with the outer peripheral wall 3 of the honeycomb structure part 4 at the eight points in "the cross section" of the honeycomb structure part 4 "which is perpendicular to the cell extending direction". The straight line L1 is a straight line passing through the center O in parallel with one partition wall. The straight line L2 is a straight line passing through the center O to form an angle of 45° with the straight line L1. The straight line L3 is a straight line passing through the center O to form an angle of 45° with the straight line L2 (an angle of 90° with the straight line L1). The straight line L4 is a straight line passing through the center O to form an angle of 45° with the straight line L3 (an angle of 90° with the straight line L2). It is to be noted that when the thickness of the outer peripheral wall 3 is measured, the thickness of a portion of the outer peripheral wall 3 which does not abut on any partition walls is measured. Therefore, when any one of the above eight points in the peripheral direction is a portion of the outer peripheral wall 3 which abuts on the partition wall, the thickness of "a portion of the outer peripheral wall 3 which is not connected to the partition wall" and which is closest to the point is measured. FIG. 12 is a schematic view showing a cross section of the one embodiment of the honeycomb structure of the present invention (the honeycomb structure 100) which is perpendicular to the cell extending direction. It is to be noted that in the honeycomb structure 100 of FIG. 12, the electrode parts are omitted.

In the honeycomb structure of the present embodiment, the thickness of each of the pair of electrode parts is preferably from 0.025 to 1.0 mm, further preferably from 0.025 to 0.7 mm, and especially preferably from 0.05 to 0.5 mm. The thickness of the electrode part is decreased in this way, thereby making it possible to decrease the heat capacity of the electrode part. Therefore, the heat shock resistance of the honeycomb structure can be enhanced. When the thickness of the electrode part is smaller than 0.025 mm, it becomes difficult to allow the current to evenly flow through the honeycomb structure part sometimes. When the thickness of the electrode part is larger than 1.0 mm, the heat capacity of the electrode part is not easily decreased sometimes. Moreover, it is especially preferable to satisfy the above "preferable relation (ratio) between the thickness of the electrode part and the thickness of the outer peripheral wall of the honeycomb structure part" as well as the above "preferable range of the thickness of the electrode part".

In the honeycomb structure of the present embodiment, a thickness of the outer peripheral wall of the honeycomb structure part is preferably from 0.1 to 1.0 mm, further preferably from 0.2 to 0.8 mm, and especially preferably from 0.2 to 0.5 mm. In such a range of the thickness of the outer peripheral wall of the honeycomb structure part, the heat shock resistance of the honeycomb structure can be enhanced. In consequence, also when the honeycomb structure is used as a catalyst support and a catalyst is loaded onto the honeycomb structure, a pressure loss at flowing of an exhaust gas can be prevented from being excessively increased. When the thickness of the outer peripheral wall of the honeycomb structure part is smaller than 0.1 mm, a strength of the honeycomb structure deteriorates sometimes. When the thickness of the outer peripheral wall of the honeycomb structure part is larger than 1.0 mm, the heat shock resistance of the honeycomb structure deteriorates sometimes. Moreover, when the thickness of the outer peripheral wall of the honeycomb structure part is larger than 1.0 mm, a partition wall area onto which the catalyst is loaded decreases sometimes, in the case where the honeycomb structure is used as the catalyst support and the catalyst is loaded onto the honeycomb structure.

When the honeycomb structure of the present embodiment satisfies the following condition (V), a porosity of the pair of electrode parts is preferably from 0.75 time to twice as much as that of the outer peripheral wall of the honeycomb structure part. In the condition (V), "the thickness of the pair of electrode parts is from 5 to 200% of the thickness of the outer peripheral wall of the honeycomb structure part, and the thickness of the pair of electrode parts is from 0.025 to 1.0 mm". Moreover, at this time, the porosity of the pair of electrode parts is preferably from 30 to 80%. In consequence, it is possible to more effectively exert the effect of enhancing the heat shock resistance of the honeycomb structure and the effect of allowing the current to evenly flow.

In the honeycomb structure of the present embodiment, the porosity of the pair of electrode parts is preferably from 0.75 time to twice, further preferably from one time to twice, and especially preferably from one to 1.75 times as much as that of the outer peripheral wall of the honeycomb structure part. In such a relation between the porosity of each of the electrode parts and the porosity of the outer peripheral wall of the honeycomb structure part, the heat capacity of the electrode part can be lower than that of the outer peripheral wall of the honeycomb structure part. In consequence, the heat shock resistance of the honeycomb structure can be enhanced. When the porosity of the electrode part is smaller than 0.75 time as much as that of the outer peripheral wall of the honeycomb structure part, it is difficult to set the heat capacity of the electrode part to be lower than that of the outer peripheral wall sometimes. When the porosity of the electrode part is larger than twice as much as the porosity of the outer peripheral wall of the honeycomb structure part, it is difficult to allow the current to evenly flow through the honeycomb structure part sometimes. The porosities of the electrode part and the outer peripheral wall are values measured by a mercury porosimeter.

In the honeycomb structure of the present embodiment, the porosity of the pair of electrode parts is preferably from 30 to 80%, further preferably from 30 to 70%, and especially preferably from 30 to 60%. In such a range of the porosity of each of the electrode parts, the heat capacity of the electrode part can be decreased. Therefore, the heat shock resistance of the honeycomb structure can be enhanced. When the porosity of the electrode part is smaller than 30%, the heat capacity of the electrode part is not easily decreased sometimes. When the porosity of the electrode part is larger than 80%, it is difficult to allow the current to evenly flow through the honeycomb structure part sometimes. Moreover, when the porosity of the electrode part is larger than 80%, the electrical resistivity of the electrode part excessively increases sometimes. Furthermore, it is especially preferable to satisfy the above "preferable relation (ratio) between the porosity of the electrode part and the porosity of the outer peripheral wall of the honeycomb structure part" and the above "preferable range of the porosity of the electrode part".

In the honeycomb structure of the present embodiment, the porosity of the outer peripheral wall of the honeycomb structure part is preferably from 35 to 60%, further preferably from 35 to 55%, and especially preferably from 35 to 50%. In such a range of the porosity of the outer peripheral wall of the honeycomb structure part, the heat shock resistance of the honeycomb structure can be enhanced. When the porosity of the outer peripheral wall of the honeycomb structure part is smaller than 35%, the effect of enhancing the heat shock resistance of the honeycomb structure deteriorates sometimes. When the porosity of the outer peripheral wall of the honeycomb structure part is larger than 60%, a mechanical strength of the honeycomb structure deteriorates sometimes.

When the honeycomb structure of the present embodiment satisfies the following condition (W), the thickness of the pair of electrode parts is preferably from 5 to 200% of the thickness of the outer peripheral wall of the honeycomb structure part. In the condition (W), "the porosity of the pair of electrode parts is from 0.75 time to twice as much as that of the outer peripheral wall of the honeycomb structure part, and the porosity of the pair of electrode parts is from 30 to 80%". Moreover, at this time, the thickness of the pair of electrode parts is preferably from 0.025 to 1.0 mm. In consequence, it is possible to more effectively exert the effect of enhancing the heat shock resistance of the honeycomb structure and allowing the current to evenly flow.

In the honeycomb structure of the present embodiment, the electrical resistivity of the electrode part 21 may be uniform, or partially vary. When the electrical resistivity of the electrode part 21 is uniform, the electrical resistivity of the electrode part 21 is preferably from 0.01 to 100 Ωcm, further preferably from 0.1 to 100 Ωcm, and especially preferably from 0.1 to 50 Ωcm. In such a range of the electrical resistivity of the electrode part 21, each of the pair of electrode parts 21 and 21 effectively performs a function of an electrode in a piping line through which a high-temperature exhaust gas flows. When the electrical resistivity of the electrode part 21 is smaller than 0.01 Ωcm, a temperature of the honeycomb structure part easily rises sometimes in the vicinities of both ends of the electrode part 21 in the cross section perpendicular to the cell extending direction. When the electrical resistivity of the electrode part 21 is larger than 100 Ωcm, the current does not easily flow, and hence the electrode part does not easily perform the function of the electrode sometimes. The electrical resistivity of the electrode part is a value at 400° C.

Figure 4:
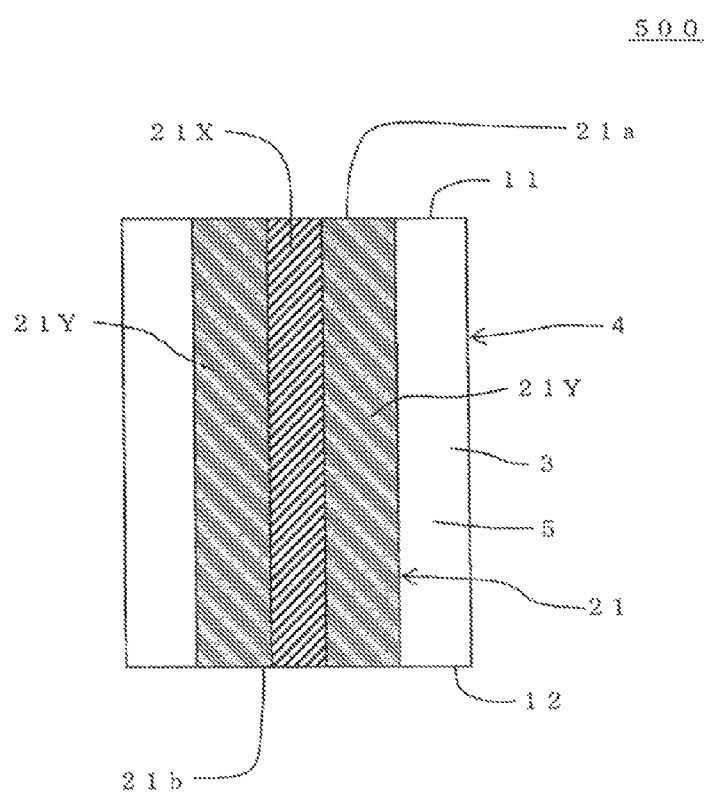
FIG. 4 is a front view schematically showing another embodiment of the honeycomb structure of the present invention.
Figure 5:
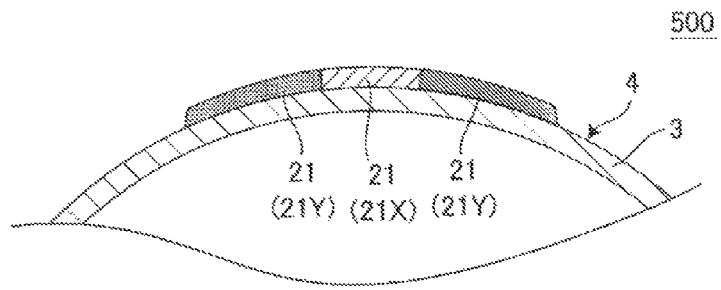
FIG. 5 is a schematic view showing a cross section of the embodiment of the honeycomb structure of the present invention which is perpendicular to the cell extending direction.

When the electrical resistivity of the electrode part 21 partially varies, the electrode part 21 is constituted of a center portion 21X and extended portions 21Y and 21Y as in a honeycomb structure 500 shown in FIG. 4 and FIG. 5, and an electrical resistivity of the center portion 21X of the electrode part 21 is preferably smaller than an electrical resistivity of each of the extended portions 21Y and 21Y of the electrode part 21. The center portion 21X is a portion of the electrode part 21 in the peripheral direction, in the cross section perpendicular to the extending direction of the cells 2. The extended portions 21Y and 21Y are portions positioned on both sides of the center portion 21X in the peripheral direction, in the cross section perpendicular to the extending direction of the cells 2. In consequence, when the electrical resistivity of the center portion 21X of the electrode part 21 is smaller than the electrical resistivity of the extended portion 21Y of the electrode part 21 and when the voltage is applied to the center portion 21X of the electrode part 21, the current easily flows to the center portion 21X having a low electrical resistivity. Therefore, the deviation of the flow of the current in the cell extending direction of the honeycomb structure decreases. In consequence, it is possible to effectively suppress the deviation of the temperature distribution in the extending direction of the cells 2 of the honeycomb structure part 4. FIG. 4 is a front view schematically showing this further embodiment of the honeycomb structure of the present invention. FIG. 5 is a schematic view showing a cross section of the further embodiment of the honeycomb structure of the present invention which is perpendicular to the cell extending direction.

The electrical resistivity of the center portion 21X is preferably from 0.0001 to 70%, further preferably from 0.001 to 50%, and especially preferably from 0.001 to 10% of the electrical resistivity of each of the extended portions 21Y and 21Y. When the electrical resistivity is smaller than 0.0001%, the flow of the current in an outer peripheral direction decreases in the cross section perpendicular to a central axis of the honeycomb structure part, and the deviation of the temperature distribution increases sometimes. When the electrical resistivity is larger than 70%, the effect of suppressing the deviation of the temperature distribution of the honeycomb structure 500 deteriorates sometimes.

Moreover, in the honeycomb structure of the present embodiment, a Young's modulus of the electrode part 21 is preferably from 2 to 50 GPa, further preferably from 3 to 45 GPa, and especially preferably from 3 to 35 GPa. In such a range of the Young's modulus of the electrode part 21, an isostatic strength of the electrode part 21 can be acquired, and cracks are not easily generated in the honeycomb structure part. When the Young's modulus of the electrode part 21 is smaller than 2 GPa, the isostatic strength of the electrode part 21 cannot be acquired sometimes. When the Young's modulus of the electrode part 21 is larger than 50 GPa, a rigidity enhances, and hence the cracks are easily generated in the honeycomb structure part sometimes. The Young's modulus may be uniform or partially vary in the electrode part 21. When the Young's modulus partially varies and the Young's modulus of a part of the electrode part is in the above range, the above effect can be acquired, and when the Young's modulus of all of the electrode part is in the above range, the above effect further enhances.

The Young's modulus of each of the electrode parts is a value measured by a bending resonance method in conformity to JIS R1602. As a test piece for use in the measurement, there is used a test piece obtained by laminating a plurality of sheets made of an electrode part forming raw material to form the electrode part, to obtain a laminated body, drying this laminated body, and then cutting the laminated body into a size of 3 mm×4 mm×40 mm.

The electrode part 21 preferably contains silicon carbide particles and silicon as main components, and is further preferably made of the silicon carbide particles and silicon as raw materials, except usually contained impurities. Here, when "the silicon carbide particles and silicon are contained as the main components", it is meant that a total mass of the silicon carbide particles and silicon is 90 mass % or more of a mass of the whole electrode part. In consequence, when the electrode part 21 contains the silicon carbide particles and silicon as the main components, the components of the electrode part 21 are the same as or close to the components of the honeycomb structure part 4 (in a case where the material of the honeycomb structure part is silicon carbide). Therefore, a thermal expansion coefficient of the electrode part 21 is the same value as that of the honeycomb structure part 4, or a value close to that of the honeycomb structure part 4. Moreover, the materials of the electrode part 21 are the same as or close to those of the honeycomb structure part 4, and hence a joining strength between the electrode part 21 and the honeycomb structure part 4 increases. Therefore, even when a heat stress is applied to the honeycomb structure, the electrode part 21 can be prevented from being peeled from the honeycomb structure part 4, and a joining portion between the electrode part 21 and the honeycomb structure part 4 can be prevented from being damaged.

An average pore diameter of the electrode part 21 preferably from 5 to 45 μm, and further preferably from 7 to 40 μm. In such a range of the average pore diameter of the electrode part 21, a suitable electrical resistivity can be obtained. When the average pore diameter of the electrode part 21 is smaller than 5 μm, the electrical resistivity excessively increases sometimes. When the average pore diameter of the electrode part 21 is larger than 40 μm, the electrode part 21 has a deteriorated strength and is easily damaged sometimes. The average pore diameter is a value measured by the mercury porosimeter.

When the main components of the electrode part 21 are the silicon carbide particles and silicon, an average particle diameter of the silicon carbide particles contained in the electrode part 21 is preferably from 10 to 70 μm, and further preferably from 10 to 60 μm. In such a range of the average particle diameter of the silicon carbide particles contained in the electrode part 21, the electrical resistivity of the electrode part 21 can be controlled in a range of 0.1 to 100 Ωcm. When the average pore diameter of the silicon carbide particles contained in the electrode part 21 is smaller than 10 μm, the electrical resistivity of the electrode part 21 excessively increases sometimes. When the average pore diameter of the silicon carbide particles contained in the electrode part 21 is larger than 70 μm, the electrode part 21 has a deteriorated strength and is easily damaged sometimes. The average particle diameter of the silicon carbide particles contained in the electrode part 21 is a value measured by a laser diffraction method.

A ratio of a mass of silicon contained in the electrode part 21 to "a total of respective masses of the silicon carbide particles and silicon" contained in the electrode part 21 is preferably from 20 to 50 mass %, and further preferably from 20 to 40 mass %. In such a range of the ratio of the mass of silicon to the total of the respective masses of the silicon carbide particles and silicon contained in the electrode part 21, the electrical resistivity of the electrode part 21 can be controlled in a range of 0.1 to 100 Ωcm. When the ratio of the mass of silicon to the total of the respective masses of the silicon carbide particles and silicon contained in the electrode part 21 is smaller than 20 mass %, the electrical resistivity excessively increases sometimes. When the ratio is larger than 50 mass %, the electrode part is easily deformed sometimes at the manufacturing.

In the honeycomb structure 100 of the present embodiment, a partition wall thickness is from 50 to 260 μm, and preferably from 70 to 180 μm. In such a range of the partition wall thickness, it is possible to prevent the pressure loss from being excessively increased when the exhaust gas is allowed to flow, in a case where the honeycomb structure 100 is used as the catalyst support and the catalyst is loaded onto the honeycomb structure. When the partition wall thickness is smaller than 50 μm, the strength of the honeycomb structure deteriorates sometimes. When the partition wall thickness is larger than 260 μm, the pressure loss increases sometimes when the exhaust gas is allowed to flow, in the case where the honeycomb structure 100 is used as the catalyst support and the catalyst is loaded onto the honeycomb structure.

In the honeycomb structure 100 of the present embodiment, a cell density is preferably from 40 to 150 cells/cm$^2$, and further preferably from 70 to 100 cells/cm$^2$. In such a range of the cell density, a purification performance of the catalyst can be enhanced in a state where the pressure loss at the flowing of the exhaust gas is decreased. When the cell density is smaller than 40 cells/cm$^2$, a catalyst loading area decreases sometimes. When the cell density is larger than 150 cells/cm$^2$, the pressure loss at the flowing of the exhaust gas increases sometimes, in the case where the honeycomb structure 100 is used as the catalyst support and the catalyst is loaded onto the honeycomb structure.

In the honeycomb structure 100 of the present embodiment, an average particle diameter of silicon carbide particles (aggregates) constituting the honeycomb structure part 4 is preferably from 3 to 50 μm, and further preferably from 3 to 40 μm. In such a range of the average particle diameter of the silicon carbide particles constituting the honeycomb structure part 4, the electrical resistivity of the honeycomb structure part 4 at 400° C. can be from 1 to 200 Ωcm. When the average particle diameter of the silicon carbide particles is smaller than 3 μm, the electrical resistivity of the honeycomb structure part 4 increases sometimes. When the average particle diameter of the silicon carbide particles is larger than 50 μm, the electrical resistivity of the honeycomb structure part 4 decreases sometimes. Furthermore, when the average particle diameter of the silicon carbide particles is larger than 50 μm, an extrusion forming die is clogged with a forming raw material sometimes at the extrusion forming of a formed honeycomb body. The average particle diameter of the silicon carbide particles is a value measured by the laser diffraction method.

In the honeycomb structure 100 of the present embodiment, the electrical resistivity of the honeycomb structure part 4 is from 1 to 200 Ω·cm, and preferably from 40 to 100 Ωcm. When the electrical resistivity is smaller than 1 Ωcm, the current excessively flows sometimes, for example, in a case where the honeycomb structure 100 is energized by a power source of a high voltage of 200 V or more. When the electrical resistivity is larger than 200 Ωcm, the current does not easily flow and the heat is not sufficiently generated sometimes, for example, in the case where the honeycomb structure 100 is energized by the power source of the high voltage of 200 V or more. The electrical resistivity of the honeycomb structure part is a value measured by a four-terminal method. The electrical resistivity of the honeycomb structure part is a value at 400° C.

In the honeycomb structure 100 of the present embodiment, the electrical resistivity of the electrode part 21 is preferably lower than the electrical resistivity of the honeycomb structure part 4. Furthermore, the electrical resistivity of the electrode part 21 is further preferably 20% or less, and especially preferably from 1 to 10% of the electrical resistivity of the honeycomb structure part 4. When the electrical resistivity of the electrode part 21 is 20% or less of the electrical resistivity of the honeycomb structure part 4, the electrode part 21 further effectively functions as the electrode.

In the honeycomb structure 100 of the present embodiment, when a material of the honeycomb structure part 4 is a silicon-silicon carbide composite material, "a mass of the silicon carbide particles" and "a mass of silicon" are preferably in the following relation. That is, a ratio of "the mass of silicon" to a total of "the mass of the silicon carbide particles" and "the mass of silicon" is preferably from 10 to 40 mass %, and further preferably from 15 to 35 mass %. When the ratio is smaller than 10 mass %, the strength of the honeycomb structure deteriorates sometimes. When the ratio is larger than 40 mass %, the shape cannot be retained sometimes at firing. The above "mass of the silicon carbide particles" is "the mass of the silicon carbide particles as the aggregates" contained in the honeycomb structure part 4. The above "mass of silicon" is "the mass of silicon as the binding agent" contained in the honeycomb structure part 4.

A porosity of each of the partition walls 1 of the honeycomb structure part 4 is preferably from 35 to 60%, and further preferably from 45 to 55%. When the porosity is smaller than 35%, the deformation at the firing enlarges sometimes. When the porosity is in excess of 60%, the strength of the honeycomb structure deteriorates sometimes. The porosity is a value measured by the mercury porosimeter.

An average pore diameter of the partition walls 1 of the honeycomb structure part 4 is preferably from 2 to 15 μm, and further preferably from 4 to 8 μm. When the average pore diameter is smaller than 2 μm, the electrical resistivity excessively increases sometimes. When the average pore diameter is larger than 15 μm, the electrical resistivity excessively decreases sometimes. The average pore diameter is a value measured by the mercury porosimeter.

A shape of the cells 2 in the cross section of the honeycomb structure 100 of the present embodiment which is perpendicular to the extending direction of the cells 2 is preferably a quadrangular shape, a hexagonal shape, an octagonal shape, or a combination of these shapes. With such a cell shape, the pressure loss at the flowing of the exhaust gas through the honeycomb structure 100 decreases, to enhance the purification performance of the catalyst.

There is not any special restriction on a shape of the honeycomb structure 100 of the present embodiment. Examples of the shape include a tubular shape with a round bottom surface (a cylindrical shape), a tubular shape with an oval bottom surface, and a tubular shape including a bottom surface having a polygonal shape (a quadrangular shape, a pentangular shape, a hexagonal shape, a heptagonal shape, an octagonal shape, or the like). Moreover, as to a size of the honeycomb structure, an area of the bottom surface is preferably from 2000 to 20000 $mm^2$, and further preferably from 4000 to 10000 $mm^2$. Furthermore, a length of the honeycomb structure in a central axis direction (the cell extending direction) is preferably from 50 to 200 mm, and further preferably from 75 to 150 mm.

The isostatic strength of the honeycomb structure 100 of the present embodiment is preferably 1 MPa or more, and further preferably 3 MPa or more. The isostatic strength preferably has a larger value. When a material, a constitution and the like of the honeycomb structure 100 are taken into consideration, an upper limit is about 6 MPa. When the isostatic strength is smaller than 1 MPa, the honeycomb structure is easily damaged sometimes during the use as the catalyst support or the like. The isostatic strength is a value measured under a hydrostatic pressure in water.

As shown in FIG. 1 and FIG. 2, each of the pair of electrode parts 21 and 21 of the honeycomb structure 100 of the present embodiment is formed into the band-like shape extending in the direction in which the cells 2 of the honeycomb structure part 4 extend and "extending along a region between both end portions (between both the end surfaces 11 and 12)". As described above, the pair of electrode parts 21 and 21 are arranged along the region between both the end portions of the honeycomb structure part 4, so that it is possible to more effectively suppress the deviation of the current flowing through the honeycomb structure part 4, when the voltage is applied between the pair of electrode parts 21 and 21. In consequence, the deviation of the heat generation in the honeycomb structure part 4 can more effectively be suppressed. Here, when "the electrode part 21 is formed (disposed) along the region between both the end portions of the honeycomb structure part 4", it is meant that the following condition (X) is satisfied. In the condition (X), "one end portion of the electrode part 21 comes in contact with one end portion (one end surface) of the honeycomb structure part 4, and the other end portion of the electrode part 21 comes in contact with the other end portion (the other end surface) of the honeycomb structure part 4".

Figure 9:
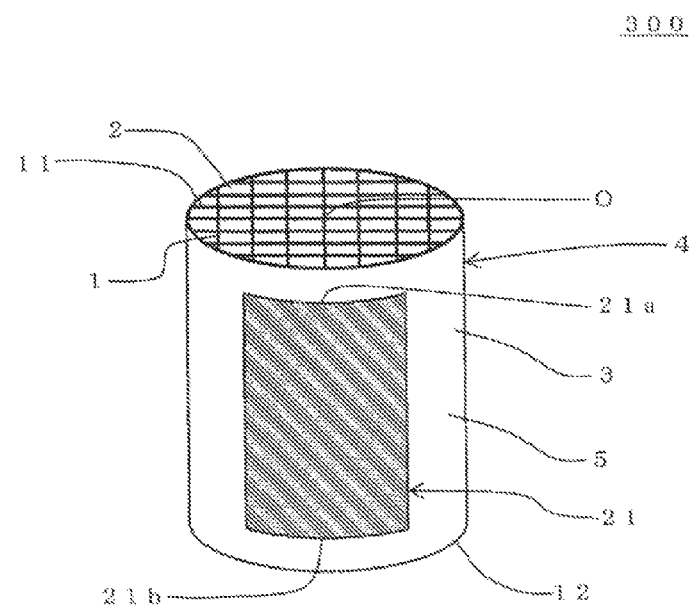
FIG. 9 is a perspective view schematically showing a further embodiment of the honeycomb structure of the present invention.
Figure 10:
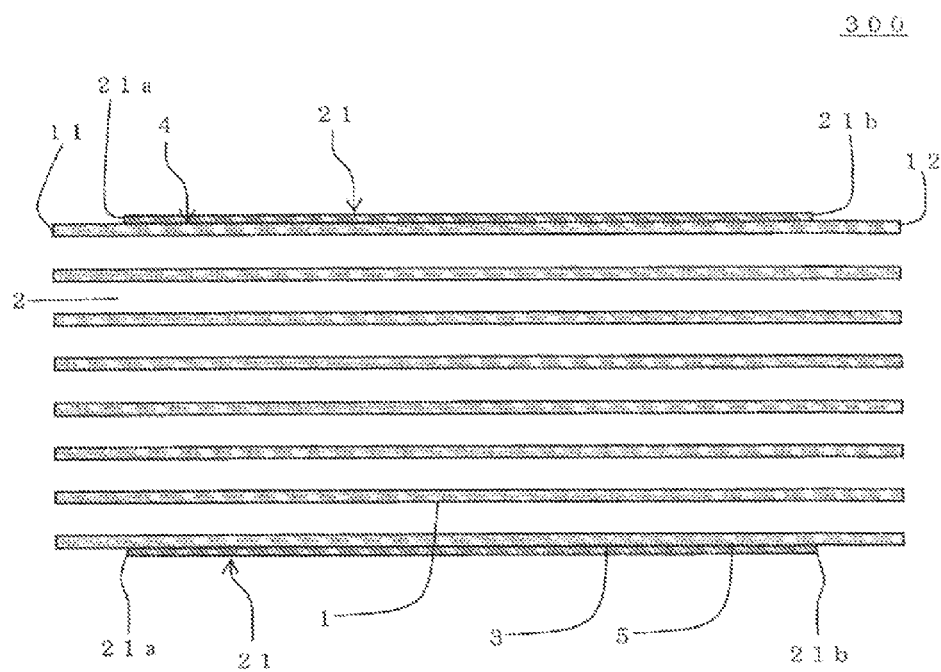
FIG. 10 is a schematic view showing a cross section of the embodiment of the honeycomb structure of the present invention which is parallel to a cell extending direction.

It is to be noted that the pair of electrode parts 21 and 21 are preferably formed to extend along the region between both the end portions of the honeycomb structure part 4 as described above (as shown in FIG. 1 and FIG. 2). On the other hand, as shown in FIG. 9 and FIG. 10, both end portions 21a and 21b of an electrode part 21 in "an extending direction of cells 2 of a honeycomb structure part 4" may not come in contact with (not reach) both end portions (both end surfaces 11 and 12) of the honeycomb structure part 4. Moreover, the one end portion 21a of the electrode part 21 may come in contact with (reach) the one end portion (the one end surface 11) of the honeycomb structure part 4, and the other end portion 21b may not come in contact with (not reach) the other end portion (the other end surface 12) of the honeycomb structure part 4. Furthermore, the following distance D1 is preferably the same as a distance from the one end portion 21a of the other electrode part 21 in the pair of electrode parts 21 and 21 to "the one end portion (the one end surface 11) of the honeycomb structure part 4", but may be different from the distance. The distance D1 is a distance from the one end portion 21a of the one electrode part 21 in the pair of electrode parts 21 and 21 to "the one end portion (the one end surface 11) of the honeycomb structure part 4". Additionally, the following distance D2 is preferably the same as a distance from the other end portion 21b of the other electrode part 21 in the pair of electrode parts 21 and 21 to "the other end portion (the other end surface 12) of the honeycomb structure part 4", but may be different from the distance. The distance D2 is a distance from the other end portion 21b of the one electrode part 21 in the pair of electrode parts 21 and 21 to "the other end portion (the other end surface 12) of the honeycomb structure part 4". Additionally, the one end portion 21a of the electrode part 21 is one end portion which is on the side of the one end portion (the one end surface 11) of the honeycomb structure part 4. The other end portion 21b of the electrode part 21 is an end portion which is on the side of the other end portion (the other end surface 12) of the honeycomb structure part 4. FIG. 9 is a perspective view schematically showing this further embodiment of the honeycomb structure of the present invention (a honeycomb structure 300). FIG. 10 is a schematic view showing a cross section of the further embodiment of the honeycomb structure of the present invention (the honeycomb structure 300) which is parallel to the cell extending direction. Respective conditions of the honeycomb structure 300 of the present embodiment are preferably the same as the respective conditions in the one embodiment of the honeycomb structure of the present invention (the honeycomb structure 100), except the following condition (Y). In the condition (Y), "at least one end portion of the electrode part 21 does not come in contact with (reach) the end portion (the end surface) of the honeycomb structure part 4".

When at least one end portion of the electrode part 21 does not come in contact with (reach) the end portion (the end surface) of the honeycomb structure part 4, the following distance D3 is preferably shorter than 50%, and is further preferably 25% or less of a length of the honeycomb structure part 4 in the extending direction of the cells 2. When the distance is 50% or more, the deviation of the current flowing through the honeycomb structure part 4 is not easily suppressed sometimes in a case where the voltage is applied between the pair of electrode parts 21 and 21. The distance D3 is a distance between "the end portion of the electrode part 21" which does not come in contact with the end portion (the end surface) of the honeycomb structure part 4 and "the end portion (the end surface) of the honeycomb structure part".

Figure 6:
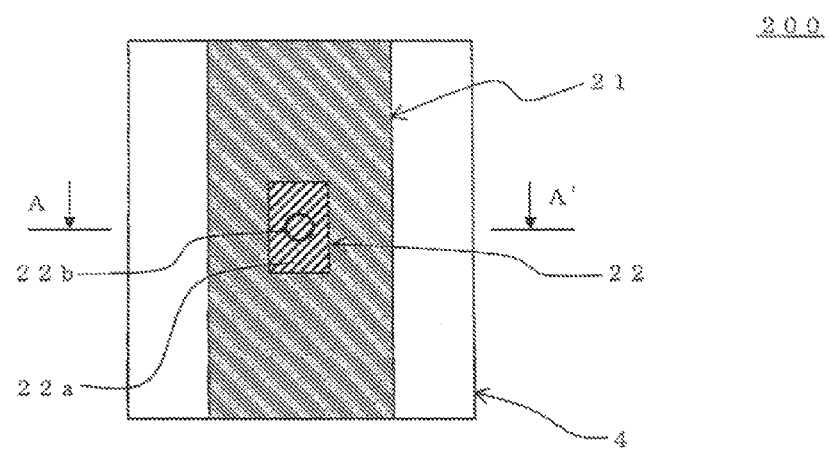
FIG. 6 is a front view schematically showing still another embodiment of the honeycomb structure of the present invention.
Figure 7:
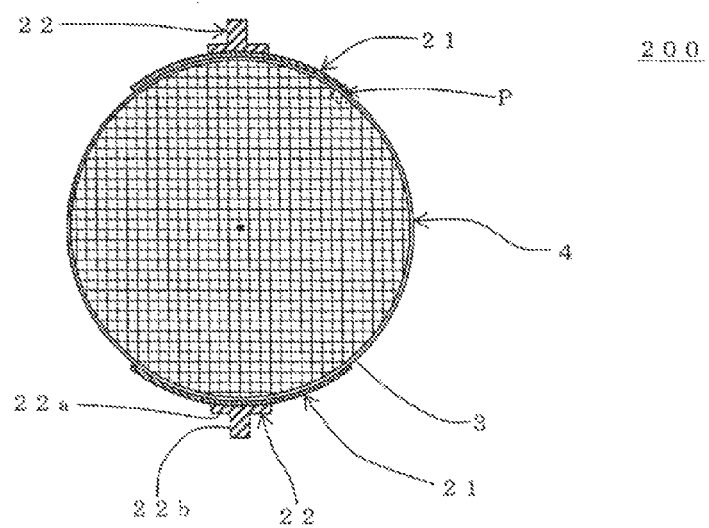
FIG. 7 is a schematic view showing a cross section taken along the line A-A' of FIG. 6.
Figure 8:
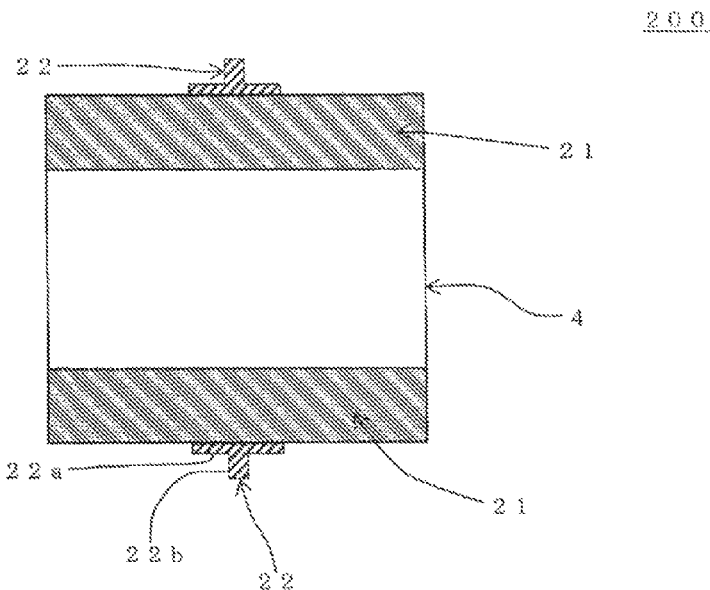
FIG. 8 is a side view schematically showing the embodiment of the honeycomb structure of the present invention.

Next, a further embodiment of the honeycomb structure of the present invention will be described. As shown in FIG. 6 to FIG. 8, in a honeycomb structure 200 of the present embodiment, electrode terminal projecting portions 22 to be connected to electric wires are arranged in the honeycomb structure 100 (see FIG. 1 to FIG. 3) of the present invention. The electrode terminal projecting portions 22 are arranged in center portions of respective electrode parts 21 and 21 in a cross section perpendicular to a cell extending direction, and in center portions of the respective electrode parts in the cell extending direction. The electrode terminal projecting portions 22 are portions to be connected to the wires from a power source so that a voltage is applied between the electrode parts 21 and 21. In this manner, the electrode terminal projecting portions 22 are arranged, and hence when the voltage is applied between the electrode parts, a deviation of a temperature distribution of a honeycomb structure part can further be decreased. FIG. 6 is a front view schematically showing this further embodiment of the honeycomb structure of the present invention. FIG. 7 is a schematic view showing a cross section taken along the A-A' line of FIG. 6. FIG. 8 is a side view schematically showing the further embodiment of the honeycomb structure of the present invention.

Respective conditions of the honeycomb structure 200 of the present embodiment are preferably the same conditions as in the one embodiment of the honeycomb structure of the present invention (the honeycomb structure 100 (see FIG. 1 to FIG. 3)), except the following condition (Z). In the condition (Z), "the electrode terminal projecting portions 22 to be connected to the electric wires are arranged in the center portions of the respective electrode parts 21 and 21 in the cross section perpendicular to the extending direction of cells 2, and the center portions of the electrode parts in the extending direction of the cells 2". "The center portion in the cross section perpendicular to the extending direction of the cells 2" is a center portion in "an outer peripheral direction of a honeycomb structure part".

When main components of the electrode part 21 are silicon carbide particles and silicon, main components of the electrode terminal projecting portion 22 are preferably also the silicon carbide particles and silicon. In this way, the electrode terminal projecting portion 22 contains the silicon carbide particles and silicon as the main components, and hence the components of the electrode part 21 are the same as (or close to) the components of the electrode terminal projecting portion 22. Therefore, a thermal expansion coefficient of the electrode part 21 is the same value as that of the electrode terminal projecting portion 22 (or a closer value). Moreover, a material of the electrode part 21 is the same as (or close to) a material of the electrode terminal projecting portion 22, and hence a joining strength between the electrode part 21 and the electrode terminal projecting portion 22 increases. In consequence, even when a heat stress is applied to the honeycomb structure, the electrode terminal projecting portion 22 can be prevented from being peeled from the electrode part 21, and a joining portion between the electrode terminal projecting portion 22 and the electrode part 21 can be prevented from being damaged. Here, when "the electrode terminal projecting portion 22 contains the silicon carbide particles and silicon as the main components", it is meant that the electrode terminal projecting portion 22 contains 90 mass % or more of the silicon carbide particles and silicon in the whole material.

There is not any special restriction on a shape of the electrode terminal projecting portion 22, and the shape may be any shape that can be joined to the electrode part 21 and the electric wire. For example, as shown in FIG. 6 to FIG. 8, the electrode terminal projecting portion 22 preferably has a shape obtained by disposing a columnar projection 22b on a quadrangular plate-like base 22a. According to such a shape, the electrode terminal projecting portion 22 can firmly be joined to the electrode part 21 by the base 22a. Moreover, the electric wire can securely be joined to the electrode terminal projecting portion by the projection 22b.

In the electrode terminal projecting portion 22, a thickness of the base 22a is preferably from 1 to 5 mm. The electrode terminal projecting portion 22 having such a thickness can securely be joined to the electrode part 21. When the thickness is smaller than 1 mm, the base 22a weakens, and the projection 22b is easily removed from the base 22a sometimes. When the thickness is larger than 5 mm, a space where the honeycomb structure is disposed enlarges more than necessary sometimes.

In the electrode terminal projecting portion 22, a length (a width) of the base 22a is preferably from 10 to 50%, and further preferably from 20 to 40% of a length of the electrode part 21. In such a range, the electrode terminal projecting portion 22 is not easily removed from the electrode part 21. When the length is shorter than 10%, the electrode terminal projecting portion 22 is easily removed from the electrode part 21 sometimes. When the length is longer than 50%, a mass increases sometimes. The above "length (width) of the base 22a" is a length of the base 22a in "an outer peripheral direction in a cross section of a honeycomb structure part 4 which is perpendicular to the cell extending direction". The above "length of the electrode part 21" is a length of the electrode part 21 "in the outer peripheral direction in the cross section of the honeycomb structure part 4 which is perpendicular to the cell extending direction (the direction along the outer periphery)". In the electrode terminal projecting portion 22, the length of the base 22a in "the extending direction of the cells 2" is preferably from 5 to 30% of a length of the honeycomb structure part 4 in the cell extending direction. In such a range of the length of the base 22a in "the extending direction of the cells 2", a sufficient joining strength can be obtained. When the length of the base 22a in "the extending direction of the cells 2" is shorter than 5% of the length of the honeycomb structure part 4 in the cell extending direction, the base is easily removed from the electrode part 21 sometimes. Moreover, when the length is longer than 30%, the mass increases sometimes.

In the electrode terminal projecting portion 22, a thickness of the projection 22b is preferably from 3 to 15 mm. The electric wire can securely be joined to the projection 22b having such a thickness. When the thickness is smaller than 3 mm, the projection 22b is easily broken sometimes. When the thickness is larger than 15 mm, the electric wire is not easily connected sometimes. Moreover, a length of the projection 22b is preferably from 3 to 20 mm. The electric wire can securely be joined to the projection 22b having such a length. When the length is shorter than 3 mm, the electric wire is not easily joined sometimes. When the length is longer than 20 mm, the projection 22b is easily broken sometimes.

An electrical resistivity of the electrode terminal projecting portion 22 is preferably from 0.1 to 2.0 Ωcm, and further preferably from 0.1 to 1.0 Ωcm. In such a range of the electrical resistivity of the electrode terminal projecting portion 22, a current can efficiently be supplied from the electrode terminal projecting portion 22 to the electrode part 21 in a piping line through which a high-temperature exhaust gas flows. When the electrical resistivity of the electrode terminal projecting portion 22 is larger than 2.0 Ωcm, the current does not easily flow, and hence the current is not easily supplied to the electrode part 21 sometimes.

A porosity of the electrode terminal projecting portion 22 is preferably from 30 to and further preferably from 30 to 40%. In such a range of the porosity of the electrode terminal projecting portion 22, a suitable electrical resistivity can be obtained. When the porosity of the electrode terminal projecting portion 22 is higher than 45%, a strength of the electrode terminal projecting portion 22 deteriorates sometimes. In particular, when the strength of the projection 22b deteriorates, the projection 22b is easily broken sometimes. The porosity is a value measured by a mercury porosimeter.

An average pore diameter of the electrode terminal projecting portion 22 is preferably from 5 to 20 µm, and further preferably from 7 to 15 µm. In such a range of the average pore diameter of the electrode terminal projecting portion 22, a suitable electrical resistivity can be obtained. When the average pore diameter of the electrode terminal projecting portion 22 is larger than 20 µm, the strength of the electrode terminal projecting portion 22 deteriorates sometimes. In particular, when the strength of the projection 22b deteriorates, the projection 22b is easily broken sometimes. The average pore diameter is a value measured by the mercury porosimeter.

When main components of the electrode terminal projecting portion 22 are silicon carbide particles and silicon, an average particle diameter of the silicon carbide particles contained in the electrode terminal projecting portion 22 is preferably from 10 to 60 µm, and further preferably from 20 to 60 µm. In such a range of the average particle diameter of the silicon carbide particles contained in the electrode terminal projecting portion 22, the electrical resistivity of the electrode terminal projecting portion 22 can be from 0.1 to 2.0 Ωcm. When an average pore diameter of the silicon carbide particles contained in the electrode terminal projecting portion 22 is smaller than 10 µm, the electrical resistivity of the electrode terminal projecting portion 22 excessively increases sometimes. When the average pore diameter of the silicon carbide particles contained in the electrode terminal projecting portion 22 is larger than 60 µm, the electrical resistivity of the electrode terminal projecting portion 22 excessively decreases sometimes. The average particle diameter of the silicon carbide particles contained in the electrode terminal projecting portion 22 is a value measured by a laser diffraction method.

A ratio of a mass of silicon contained in the electrode terminal projecting portion 22 to "a total of respective masses of the silicon carbide particles and silicon" contained in the electrode terminal projecting portion 22 is preferably from 20 to 40 mass %, and further preferably from 25 to 35 mass %. In such a range of the ratio of the mass of silicon to the total of the respective masses of the silicon carbide particles and silicon contained in the electrode terminal projecting portion 22, the electrical resistivity of 0.1 to 2.0 Ωcm can easily be obtained. When the ratio of the mass of silicon to the total of the respective masses of the silicon carbide particles and silicon contained in the electrode terminal projecting portion 22 is smaller than 20 mass %, the electrical resistivity excessively increases sometimes. Moreover, when the ratio is larger than 40 mass %, the electrode terminal projecting portions are deformed sometimes at manufacturing.

Figure 11:
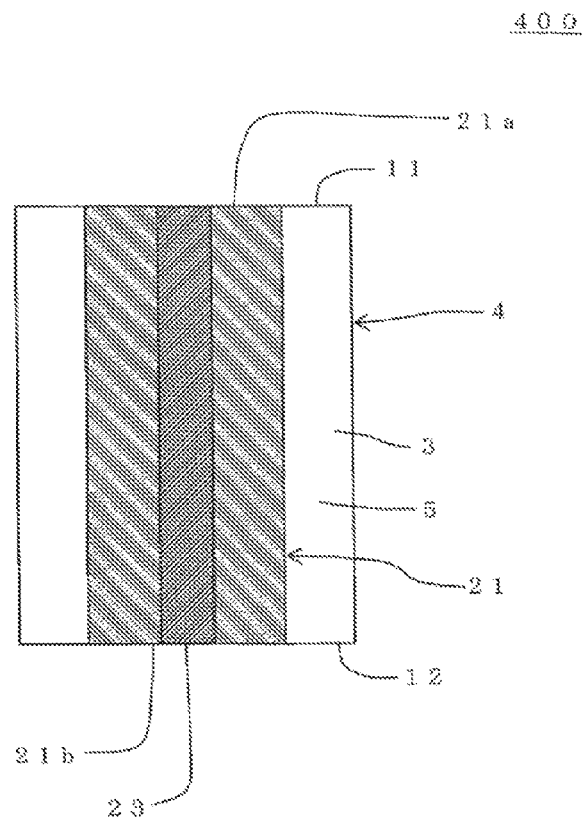
FIG. 11 is a front view schematically showing a still further embodiment of the honeycomb structure of the present invention.

Next, a still further embodiment of the honeycomb structure of the present invention will be described. A honeycomb structure 400 of the present embodiment (see FIG. 11) has a constitution in which a conductor 23 is disposed on the surface of an electrode part 21 in the above-mentioned one embodiment (the honeycomb structure 100 (see FIG. 1 to FIG. 3)) of the honeycomb structure of the present invention. In the honeycomb structure 400 of the present embodiment, the conductor 23 has an electrical resistivity lower than that of the electrode part 21. Therefore, the honeycomb structure 400 of the present embodiment preferably has the same conditions as those of the honeycomb structure 100 of the present invention (see FIG. 1 to FIG. 3), except that the honeycomb structure has the conductor 23. FIG. 11 is a front view schematically showing this still further embodiment of the honeycomb structure of the present invention.

As described above, in the honeycomb structure 400 of the present embodiment, the conductor 23 having the electrical resistivity lower than that of the electrode part 21 is disposed on the surface of the electrode part 21. Therefore, a voltage is applied to the conductor 23, thereby making it possible to allow a current to more evenly flow through the whole honeycomb structure part.

The electrical resistivity of the conductor 23 is preferably from 0.0001 to 70%, further preferably from 0.001 to 50%, and especially preferably from 0.001 to 10% of the electrical resistivity of the electrode part 21. When the electrical resistivity is smaller than 0.0001%, the flow of the current in an outer peripheral direction in a cross section perpendicular to the central axis of the honeycomb structure part decreases, and a deviation of a temperature distribution increases sometimes. When the electrical resistivity is larger than 70%, an effect of the honeycomb structure 400 to suppress the deviation of the temperature distribution deteriorates sometimes. The electrical resistivity is a value at 400° C.

There is not any special restriction on a shape (an outer peripheral shape) of the conductor 23. As shown in FIG. 11, the shape is preferably a rectangular shape extending from one end portion 21a of the electrode part to the other end portion 21b of the electrode part. The conductor 23 does not have to be disposed along a region between both the end portions of the electrode part. That is, a space may be made between an end portion of the conductor 23 and the end portion of the electrode part. A length of the conductor 23 is preferably 50% or more, further preferably 80% or more, and especially preferably 100% of a length of the electrode part 21. When the length is shorter than 50%, the effect of allowing the current to more evenly flow through the whole honeycomb structure part when applying the voltage deteriorates sometimes. The above "length of the conductor 23" is a length of the conductor 23 in an extending direction of "cells of the honeycomb structure part". The above "length of the electrode part 21" is a length of the electrode part 21 in the extending direction of "the cells of the honeycomb structure part".

Moreover, there is not any special restriction on a length of the conductor 23 in a peripheral direction (the peripheral direction in an outer periphery (a side surface) of the honeycomb structure part), as long as the length is not more than the length of the electrode part in the peripheral direction. The length of the conductor 23 in the peripheral direction is preferably from 5 to 75%, and further preferably from 10 to 60% of the length of the electrode part in the peripheral direction. When the length is longer than 75%, a temperature of the honeycomb structure part easily rises in the vicinities of both ends of the electrode part 21 sometimes, in a cross section perpendicular to the cell extending direction. When the length is shorter than 5%, the effect of allowing the current to more evenly flow through the whole honeycomb structure part, when applying the voltage, deteriorates sometimes.

An example of a material of the conductor 23 is a material formed by impregnating silicon carbide with silicon so as to achieve a porosity of 5% or less.

Moreover, a thickness of the conductor 23 is preferably from 0.1 to 2 mm, further preferably from 0.2 to 1.5 mm, and especially preferably from 0.3 to 1 mm. When the thickness is larger than 2 mm, a heat shock resistance of the honeycomb structure deteriorates sometimes. When the thickness is smaller than 0.1 mm, a strength of the conductor 23 deteriorates sometimes.

The honeycomb structure of the present invention can be used as a catalyst support. The honeycomb structure of the present invention, onto which a known catalyst is loaded by a known method, can be used as a catalyst for treatment of an exhaust gas.

(2) Manufacturing Method of Honeycomb Structure:

Next, a manufacturing method of the honeycomb structure of the present invention will be described. There will be described a method of manufacturing the honeycomb structure 200 (see FIG. 6 to FIG. 8) which is the above further embodiment of the honeycomb structure of the present invention (hereinafter referred to as "a manufacturing method (A)" sometimes).

First, metal silicon powder (metal silicon), a binder, a surfactant, a pore former, water and the like are added to silicon carbide powder (silicon carbide), to prepare a forming raw material. A mass of metal silicon is preferably from 10 to 40 mass % of a total of a mass of the silicon carbide powder and the mass of metal silicon. An average particle diameter of silicon carbide particles in the silicon carbide powder is preferably from 3 to 50 μm, and further preferably from 3 to 40 μm. An average particle diameter of metal silicon (the metal silicon powder) is preferably from 2 to 35 μm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure part is a silicon-silicon carbide composite material. When the material of the honeycomb structure part is silicon carbide, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as pores are formed after the firing, and examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged sometimes at forming. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method in which a kneader, a vacuum clay kneader or the like is used.

Next, the kneaded material is extruded to obtain a formed honeycomb body. In the extrusion forming, a die having a desirable whole shape, cell shape, partition wall thickness, cell density and the like is preferably used. A material of the die is preferably a hard metal which does not easily wear down. The formed honeycomb body is a structure having partition walls with which a plurality of cells are formed to become through channels of a fluid, and an outer peripheral wall positioned on an outermost periphery.

The partition wall thickness, cell density, outer peripheral wall thickness and the like of the formed honeycomb body can suitably be determined in accordance with a constitution of the honeycomb structure of the present invention which is to be prepared, in consideration of shrinkages at drying and firing.

The obtained formed honeycomb body is preferably dried. There is not any special restriction on a drying method, and examples of the method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system. The whole formed body can immediately and evenly be dried so that any cracks are not generated. As drying conditions, it is preferable that the water content of 30 to 99 mass % of an amount of the water content prior to the drying is removed by the electromagnetic heating system, and then the water content is decreased to 3 mass % or less by the external heating system. The electromagnetic heating system is preferably the dielectric heating drying. The external heating system is preferably the hot air drying.

When the length of the formed honeycomb body in the central axis direction is not a desirable length, both end surfaces (both end portions) of the formed honeycomb body are preferably cut so as to achieve the desirable length. There is not any special restriction on a cutting method, and an example of the cutting method is a method using a disc saw cutter or the like.

Next, an electrode part forming raw material to form the electrode parts is prepared. When the main components of the electrode parts are silicon carbide and silicon, the electrode part forming raw material is preferably formed by adding predetermined additives to silicon carbide powder and silicon powder, followed by kneading. It is to be noted that when the electrode part constituted of the center portion and the extended portions is formed, a center portion forming raw material and an extended portion forming raw material are prepared, respectively. When main components of the center portion are silicon carbide and silicon, the center portion forming raw material is preferably obtained by adding predetermined additives to silicon carbide powder and silicon powder, followed by kneading. When main components of the extended portions are silicon carbide and silicon, the extended portion forming raw material is preferably obtained by adding predetermined additives to silicon carbide powder and silicon powder, followed by kneading.

Specifically, metal silicon powder (metal silicon), a binder, a surfactant, a pore former, water and the like are added to the silicon carbide powder (silicon carbide), and kneaded to prepare the electrode part forming raw material. A mass of metal silicon is preferably from 20 to 40 parts by mass, when a total mass of the silicon carbide powder and metal silicon is 100 parts by mass. An average particle diameter of silicon carbide particles in the silicon carbide powder is preferably from 10 to 60 µm. An average particle diameter of the metal silicon powder (metal silicon) is preferably from 2 to 20 µm. When the average particle diameter is smaller than 2 µm, an electrical resistivity excessively decreases sometimes. When the average particle diameter is larger than 20 µm, the electrical resistivity excessively increases sometimes. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode part forming raw material. There is not any special restriction on a kneading method, and, for example, a vertical stirrer can be used.

Next, the obtained electrode part forming raw material is preferably applied to the side surface of the dried formed honeycomb body. There is not any special restriction on a method of applying the electrode part forming raw material to the side surface of the formed honeycomb body, and, for example, a printing method can be used. Moreover, the electrode part forming raw material is preferably applied to the side surface of the formed honeycomb body so as to achieve the shapes and arrangement of the electrode parts in the above honeycomb structure of the present invention. It is to be noted that when the electrode parts each constituted of the center portion and the extended portions are formed, each of the center portion forming raw material and the extended portion forming raw material is preferably applied to the side surface of the dried formed honeycomb body so as to achieve the shapes of the center portion 21X and extended portions 21Y of the electrode part 21 in the honeycomb structure 500 shown in FIG. 4 and FIG. 5. There is not any special restriction on a method of applying the center portion forming raw material and the extended portion forming raw material to the side surface of the formed honeycomb body, and similarly to the case where the electrode part forming raw material is applied, for example, the printing method can be used.

In another preferable configuration, when the electrode part forming raw material is applied to the side surface of the formed honeycomb body, the outer peripheral shape of the formed electrode part is the following shape. That is, the shape is a rectangular shape including at least one curved corner portion, or a rectangular shape including at least one linearly chamfered corner portion.

A thickness of each of the electrode parts can be set to a desirable thickness, by regulating the thickness of the electrode part forming raw material when the material is applied. In consequence, the electrode part can be formed simply by applying the electrode part forming raw material to the side surface of the formed honeycomb body, and carrying out the drying and firing. Therefore, the electrode part can very easily be formed.

Next, the electrode part forming raw material applied to the side surface of the formed honeycomb body is preferably dried. In consequence, it is possible to obtain "the dried "formed honeycomb body to which the electrode part forming raw material is applied (any electrode terminal projecting portion forming members are not attached)"". A drying condition is preferably from 50 to 100° C.

Next, the electrode terminal projecting portion forming members are preferably prepared. The electrode terminal projecting portion forming members are attached to the formed honeycomb body, to form the electrode terminal projecting portions. There is not any special restriction on a shape of the electrode terminal projecting portion forming members, but a shape shown in, for example, FIG. 6 to FIG. 8 is preferably formed. Moreover, the obtained electrode terminal projecting portion forming members are preferably attached to a portion to which the electrode part forming raw material is applied, in the formed honeycomb body to which the electrode part forming raw material is applied. It is to be noted that an order of the preparation of the formed honeycomb body, the preparation of the electrode part forming raw material and the preparation of the electrode terminal projecting portion forming members may be any order.

The electrode terminal projecting portion forming members are preferably obtained by forming and drying an electrode terminal projecting portion forming raw material (the raw material to form the electrode terminal projecting portion forming members). When the main components of the electrode terminal projecting portions are silicon carbide and silicon, the electrode terminal projecting portion forming raw material is preferably formed by adding predetermined additives to silicon carbide powder and silicon powder and kneading this mixture.

Specifically, metal silicon powder (metal silicon), a binder, a surfactant, a pore former, water and the like are added to the silicon carbide powder (silicon carbide), and kneaded to prepare the electrode terminal projecting portion forming raw material. A mass of metal silicon is preferably from 20 to 40 mass % of a total of a mass of the silicon carbide powder and the mass of metal silicon. An average particle diameter of silicon carbide particles in the silicon carbide powder is preferably from 10 to 60 µm. An average particle diameter of the metal silicon powder (metal silicon) is preferably from 2 to 20 µm. When the average particle diameter is smaller than 2 µm, an electrical resistivity excessively decreases sometimes. When the average particle diameter is larger than 20 µm, the electrical resistivity excessively increases sometimes. The average particle diameters of the silicon carbide particles and metal silicon particles (metal silicon) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the electrode terminal projecting portion forming raw material. There is not any special restriction on a kneading method, and, for example, a kneader can be used.

There is not any special restriction on a method of forming the obtained electrode terminal projecting portion forming raw material, to achieve a shape of the electrode terminal projecting portion forming members, and an example of the method is a method of carrying out processing after extrusion forming.

It is preferable that the electrode terminal projecting portion forming raw material is formed into the shape of the electrode terminal projecting portion forming members, and then dried to obtain the electrode terminal projecting portion forming members. A drying condition is preferably from 50 to 100° C.

Next, the electrode terminal projecting portion forming members are preferably attached to the formed honeycomb body to which the electrode part forming raw material is applied. There is not any special restriction on a method of attaching the electrode terminal projecting portion forming members to the formed honeycomb body (the portions of the formed honeycomb body to which the electrode part forming raw material is applied). The electrode terminal projecting portion forming members are preferably attached to the formed honeycomb body by use of the above electrode part forming raw material. For example, first, the electrode part forming raw material is applied to "the surfaces" of the electrode terminal projecting portion forming members "which are attached to the formed honeycomb body (the surfaces which come in contact with the formed honeycomb body)". Afterward, the electrode terminal projecting portion forming members are preferably attached to the formed honeycomb body so that "the surface to which the electrode part forming raw material is applied" comes in contact with the formed honeycomb body.

Then, "the formed honeycomb body to which the electrode part forming raw material is applied and the electrode terminal projecting portion forming members are attached" is preferably dried and fired, to obtain the honeycomb structure of the present invention. It is to be noted that when the one embodiment (the honeycomb structure 100, see FIG. 1 to FIG. 3) of the honeycomb structure of the present invention is prepared, "the dried formed honeycomb body" may be subjected to a treatment such as firing by the following method. The above "dried formed honeycomb body" is the above dried "formed honeycomb body to which the electrode part forming raw material is applied (any electrode terminal projecting portion forming members are not attached)". A treatment such as the firing includes calcinating, the firing, and an oxidation treatment.

A drying condition at this time is preferably from 50 to 100° C.

Moreover, prior to the firing, the calcinating is preferably performed to remove the binder and the like. The calcinating is preferably performed at 400 to 500° C. in the atmosphere for 0.5 to 20 hours. There is not any special restriction on a calcinating and firing method, and the firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, the oxidation treatment is preferably performed at 1200 to 1350° C. for one to ten hours, to enhance a durability.

It is to be noted that the electrode terminal projecting portion forming members may be attached before or after firing the formed honeycomb body. When the electrode terminal projecting portion forming members are attached to the formed honeycomb body which has been fired, the fired formed honeycomb body is preferably then fired again on the above conditions.

Next, a manufacturing method of the honeycomb structure 400 shown in FIG. 11 will be described. According to the manufacturing method of the honeycomb structure 400, in the above manufacturing method (A), "the dried formed honeycomb body" is prepared, and then any electrode terminal projecting portion forming members are not attached, but the conductor 23 is disposed.

An example of a method of disposing the conductor 23 in "the dried formed honeycomb body" is a method of attaching the conductor 23 to the surface of the electrode part, and performing the firing. The above "dried formed honeycomb body" is the dried "formed honeycomb body to which the electrode part forming raw material is applied (any electrode terminal projecting portion forming members are not attached)".

EXAMPLES

Hereinafter, examples of the present invention will further specifically be described, but the present invention is not limited to these examples.

Example 1

Silicon carbide (SiC) powder and metal silicon (Si) powder were mixed at a mass ratio of 80:20. To this mixture, hydroxypropyl methylcellulose as a binder and a water-absorbing resin as a pore former were added, and water was added, to prepare a forming raw material.

Afterward, the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 μm. An average particle diameter of the metal silicon powder was 6 μm. Moreover, an average particle diameter of the pore former was 20 μm. The average particle diameters of silicon carbide, metal silicon and the pore former were values measured by a laser diffraction method.

The obtained columnar kneaded material was formed by using an extrusion forming machine, to obtain a formed honeycomb body. The obtained formed honeycomb body was subjected to high-frequency dielectric heating and drying. Afterward, the formed honeycomb body was dried at 120° C. for two hours by use of a hot air drier, and both end surfaces of the formed honeycomb body were cut as much as predetermined amounts.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, and mixed. This mixture was kneaded to prepare an electrode part forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 μm. An average particle diameter of the metal silicon powder was 6 μm. The average particle diameters of silicon carbide and metal silicon were values measured by the laser diffraction method. The kneading was carried out by a vertical stirrer.

Next, the electrode part forming raw material was applied, in a band-like state, to the side surface of the dried formed honeycomb body so that a thickness of the material (the thickness after drying and firing) was 1.0 mm and "0.5 time a center angle was 49.3° in a cross section perpendicular to a cell extending direction". The electrode part forming raw material was applied to two portions of the side surface of the dried formed honeycomb body. Then, in the cross section perpendicular to the cell extending direction, one of the two portions to which the electrode part forming raw material was applied was disposed opposite to the other portion via the center of the formed honeycomb body. A shape (an outer peripheral shape) of the electrode part forming raw material applied to the side surface of the formed honeycomb body was a rectangular shape. Then, the electrode part forming raw material was applied to the side surface of a honeycomb structure part so that a film formed by the electrode part forming raw material extended along a region between both end portions of the formed honeycomb body.

Next, the electrode part forming raw material applied to the formed honeycomb body was dried. A drying condition was 70° C.

Next, silicon carbide (SiC) powder and metal silicon (Si) powder were mixed at a mass ratio of 60:40. To this mixture, hydroxypropyl methylcellulose as a binder was added, and water was also added, and mixed. This mixture was kneaded to prepare an electrode terminal projecting portion forming raw material. The electrode terminal projecting portion forming raw material was kneaded by using a vacuum clay kneader, to prepare a kneaded material. A content of the binder was 4 parts by mass, when a total of the silicon carbide (SiC) powder and the metal silicon (Si) powder was 100 parts by mass. A content of the water was 22 parts by mass, when the total of the silicon carbide (SiC) powder and the metal silicon (Si) powder was 100 parts by mass. An average particle diameter of the silicon carbide powder was 52 μm. An average particle diameter of the metal silicon powder was 6 μm. The average particle diameters of silicon carbide and metal silicon were values measured by the laser diffraction method.

The obtained kneaded material was processed into a shape (the shape constituted of a base and a projection) as in an electrode terminal projecting portion 22 shown in FIG. 6 to FIG. 8, and was dried, to obtain electrode terminal projecting portion forming members. Moreover, a drying condition was 70° C. A portion corresponding to a plate-like base 22a had a size of "3 mm×12 mm×15 mm". Moreover, a portion corresponding to a projection 22b was a columnar portion having a bottom surface diameter of 7 mm and a length of 10 mm in a central axis direction. Two electrode terminal projecting portion forming members were prepared.

Next, the two electrode terminal projecting portion forming members were attached to two portions of the formed honeycomb body to which the electrode part forming raw material was applied, respectively. The electrode terminal projecting portion forming members were attached to the portions of the formed honeycomb body to which the electrode part forming raw material was applied, by use of the electrode part forming raw material. Afterward, "the formed honeycomb body to which the electrode part forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter (an air pore diameter) of partition walls of the obtained honeycomb structure was 8.6 μm, and a porosity was 45%. The average pore diameter and the porosity were values measured by a mercury porosimeter (AutoPore IV9505 manufactured by Micromeritics Co.). Furthermore, a thickness of each of the partition walls of the honeycomb structure was 101.6 μl, and a cell density was 93 cells/cm². Moreover, a bottom surface of the honeycomb structure had a round shape of a diameter of 93 mm, and a length of the honeycomb structure in the cell extending direction was 100 mm. Furthermore, an isostatic strength of the obtained honeycomb structure was 2.5 MPa. The isostatic strength was a breaking strength measured under a hydrostatic pressure in water. Additionally, 0.5 time the center angle in the cross section of each of two electrode parts of the honeycomb structure which was perpendicular to the cell extending direction was 49.3°. Moreover, an electrical resistivity of the electrode part was 0.8 Ωcm, an electrical resistivity of the honeycomb structure part was 40 Ωcm, and an electrical resistivity of an electrode terminal projecting portion was 0.8 Ωcm.

Moreover, a heat capacity of electrode parts of the obtained honeycomb structure (a total of heat capacities of a pair of electrode parts) was 7.9 J/gK. Furthermore, a heat capacity of a (whole) outer peripheral wall was 10.9 J/gK. Additionally, a thickness of each of the electrode parts was 0.4 mm, and a thickness of the outer peripheral wall was 0.3 mm. Moreover, a porosity of the electrode part was 40%, a Young's modulus of the electrode part was 29 GPa, and a porosity of the outer peripheral wall was 40%.

The heat capacity of the electrode part was a value obtained by a heat capacity calculating method in which the porosity, a specific gravity of the material and specific heat were taken into consideration, on the basis of a volume of each of the electrode parts. "The volume of the electrode part" was a volume of each of the electrode parts which was calculated by using an average thickness and electrode angle of the electrode part which were measured by an optical microscope. The heat capacity of the whole outer peripheral wall was a value obtained by the heat capacity calculating method in which the porosity, the specific gravity of the material and the specific heat were taken into consideration, on the basis of a volume of the outer peripheral wall. "The volume of the outer peripheral wall" was a volume of the outer peripheral wall which was calculated by using an average thickness of the outer peripheral wall measured by the optical microscope. Moreover, the thickness of the electrode part was a value of an average thickness of three points of the electrode part in a peripheral direction which was measured by the optical microscope. Furthermore, the thickness of the outer peripheral wall was a value of an average thickness of eight points of the outer peripheral wall in the peripheral direction which was measured by the optical microscope. Additionally, the porosities of the electrode parts and the outer peripheral wall were values measured by a mercury porosimeter (AutoPore IV9505 manufactured by Micromeritics Co.).

Moreover, the electrical resistivities of the honeycomb structure part, each of the electrode parts and each of the electrode terminal projecting portions were measured by the following method. A test piece of 10 mm×10 mm×50 mm was prepared by using the same material as that of an object to be measured. specifically, when the electrical resistivity of the honeycomb structure part was measured, the test piece was prepared by using the same material as that of the honeycomb structure part. When the electrical resistivity of the electrode part was measured, the test piece was prepared by using the same material as that of the electrode part. Moreover, when the electrical resistivity of the electrode terminal projecting portion was measured, the test piece was prepared by using the same material as that of the electrode terminal projecting portion. All surfaces of both end portions (both the end portions in a longitudinal direction) of each of the test pieces were coated with a silver paste, and provided with a wiring line, thereby enabling energization. A voltage applying current measuring device was connected to the test piece, to apply a voltage thereto. A thermocouple was disposed in the center of the test piece, and a change of a temperature of the test piece with an elapse of time when applying the voltage was confirmed by a recorder. A voltage of 100 to 200 V was applied, and a current value and a voltage value were measured in a state where the temperature of the test piece was 400° C. The electrical resistivity was calculated from the obtained current value and voltage value, and a test piece dimension.

The Young's modulus of each of the electrode parts was measured by a bending resonance method in conformity to JIS R1602. As a test piece for use in the measurement, there was used a piece (the test piece) obtained by preparing a bulk body by use of a raw material to form the electrode parts, and cutting this bulk body into a size of 3 mm×4 mm×40 mm.

As to the obtained honeycomb structure, "a temperature difference", "a heat shock resistance" (cracks), "a resistance change" and "the highest temperature" were measured by the following method. The results are shown in Table 1. In Table 1, a column of "A/B" indicates a ratio (%) of an electrode thickness A to an outer peripheral wall thickness B. Moreover, a column of "C/D" indicates a magnification (times) of an electrode porosity C to an outer peripheral wall porosity D. Furthermore, a column of "E/F" indicates a ratio (%) of an electrode part heat capacity E to an outer peripheral wall heat capacity F.

(Temperature Difference)

A heating cooling test of the honeycomb structure was carried out by using a propane gas burner test machine, and in this case, an evaluation test of a temperature difference in the honeycomb structure was carried out. In the propane gas burner test machine, it was possible to supply a heated gas into a metal case containing the honeycomb structure by use of a gas burner to burn a propane gas. Specifically, in the heating cooling test, the obtained honeycomb structure was first contained (canned) in the metal case of the propane gas burner test machine. Then, the gas heated by the gas burner was supplied into the metal case, and allowed to pass through the honeycomb structure. Temperature conditions (inlet gas temperature conditions) of the heated gas flowing into the metal case were as follows. First, the temperature was raised up to 950° C. in five minutes, held at 950° C. for ten minutes, lowered down to 100° C. in five minutes, and then held at 100° C. for ten minutes. Then, during the heating and cooling of the honeycomb structure, there were continuously measured a temperature of the surface of the outer peripheral wall of the honeycomb structure, and a temperature at a position of 5 mm inwardly from the surface of the outer peripheral wall of the honeycomb structure. A position in a gas flow direction (a temperature measuring position) was the center. Then, there was calculated a temperature difference (the maximum temperature difference) at a time when a difference between the temperature of the surface of the outer peripheral wall and the temperature at the position of 5 mm inwardly from the surface of the outer peripheral wall was maximized. This maximum temperature difference is shown as "the temperature difference" in Table 1. The temperature of the honeycomb structure was measured by a thermocouple.

(Heat Shock Resistance)

The heating cooling test of the honeycomb structure was carried out by using the propane gas burner test machine, and in this case, the evaluation test of the temperature difference in the honeycomb structure was carried out. In the propane gas burner test machine, it was possible "to supply the heated gas" into the metal case containing the honeycomb structure "by use of the gas burner to burn the propane gas". Specifically, in the above evaluation test, the obtained honeycomb structure was first contained (canned) in the metal case of the propane gas burner test machine. Then, the gas heated by the gas burner was supplied into the metal case, and allowed to pass through the honeycomb structure. The temperature conditions (the inlet gas temperature conditions) of the heated gas flowing into the metal case were as follows. First, the temperature was raised up to 950° C. in five minutes, held at 950° C. for ten minutes, lowered down to 100° C. in five minutes, and then held at 100° C. for ten minutes. Afterward, the heating cooling cycle of "raising the temperature from 100° C. to 950° C. in five minutes, holding 950° C. for ten minutes, and then cooling down to 100° C. in five minutes" was repeated as much as 100 cycles. Afterward, the gas was cooled down to room temperature, and a crack generation state of the honeycomb structure was confirmed. The test result of the heat shock resistance is shown in a column of "cracks" of Table 1. "None" in the column of "the cracks" indicates that any cracks were not generated, and "present" indicates that the cracks were generated. "None" passed. The case where the cracks were "present" "passed" when the result of "the resistance change" was "none", and the case failed when the result of "the resistance change" was "present".

(Resistance Change)

A resistance value of the honeycomb structure before carrying out the above "heat shock resistance" test was measured, and a resistance value of the honeycomb structure after carrying out the "heat shock resistance" test was measured. When a difference between the resistance values before and after the "heat shock resistance" test was within 5% of the resistance value of the honeycomb structure before the "heat shock resistance" test, "the resistance change" was "none". When the above difference between the resistance values was in excess of 5% of the resistance value of the honeycomb structure before the "heat shock resistance" test, "the resistance change" was "present". This evaluation result is shown in "a resistance change (A)" column in Table 1. The evaluation by the above evaluation standard is "the resistance change (A)".

Furthermore, "the resistance change" was also evaluated in accordance with the following evaluation standard. When a difference between the resistance values before and after the "heat shock resistance" test was within 20% of the resistance value of the honeycomb structure before the "heat shock resistance" test, "the resistance change" was "none". When a difference between the resistance values was in excess of 20% and smaller than 100% of the resistance value of the honeycomb structure before the "heat shock resistance" test, the resistance change was "small". When the above difference between the resistance values was 100% or more of the resistance value of the honeycomb structure before the "heat shock resistance" test, the resistance change was "large". This evaluation result is shown in "a resistance change (B)" column in Table 1. The evaluation by the above evaluation standard is "the resistance change (B)".

To measure the resistance value, the electrode terminal projecting portion of the honeycomb structure was provided with a wiring line and energized. At the measurement, a voltage applying current measuring device was connected to the honeycomb structure, to apply the voltage thereto. A voltage of 100 to 200 V was applied, a current value and a voltage value were measured, and the electrical resistivity of the honeycomb structure was calculated from the obtained current value and voltage value. Then, a resistance value which became minimum during the energization was the resistance value (the resistance) of the honeycomb structure. When large cracks were generated, the resistance value increased.

In each of the evaluations of "the resistance change (A)" and "the resistance change (B)", the case where "the resistance change" was "none" passed. Moreover, even when "the resistance change" in the evaluation of "the resistance change (A)" was "present", the "small" resistance change" in the evaluation of "the resistance change (B)" passed. Even when "the resistance change" in the evaluation of "the resistance change (A)" was "present", the "large" resistance change" in the evaluation of "the resistance change (B)" failed.

(Highest Temperature)

Temperatures of the honeycomb structure part when applying a voltage of 200 V to the obtained honeycomb structure were measured. "The temperatures of the honeycomb structure part" were temperatures "at a position with which an end portion of the electrode part (the end portion in the peripheral direction) came in contact, and at a position with which the center point of the electrode part in the peripheral direction came in contact in a cross section" of the honeycomb structure part "which was perpendicular to a cell extending direction". The highest temperature of the measured temperatures was the highest temperature. In the honeycomb structure part, the position with which the end portion of the electrode part (the end portion in the peripheral direction) came in contact or the position with which the center point of the electrode part in the peripheral direction came in contact was a position where the current flowed most, and this position was a portion having the highest temperature in the honeycomb structure. The position in the gas flow direction (the temperature measuring position) was the center.

TABLE 1

| | Electrode thickness A (mm) | Outer peripheral wall thickness B (mm) | A/B (%) | Electrode porosity C (%) | Electrode Young's modulus (Gpa) | Outer peripheral wall porosity D (%) | C/D (times) | Electrode part heat capacity E (J/gK) |
|---|---|---|---|---|---|---|---|---|
| Example 1 | 0.4 | 0.3 | 133 | 40 | 29 | 40 | 1 | 7.9 |
| Example 2 | 0.25 | 0.3 | 83 | 40 | 29 | 40 | 1 | 5.0 |
| Example 3 | 0.1 | 0.3 | 33 | 40 | 29 | 40 | 1 | 2.0 |
| Example 4 | 0.05 | 0.3 | 17 | 40 | 29 | 40 | 1 | 1.0 |
| Example 5 | 0.025 | 0.3 | 8 | 40 | 29 | 40 | 1 | 0.5 |
| Example 6 | 1 | 1 | 100 | 40 | 29 | 40 | 1 | 19.9 |
| Example 7 | 0.5 | 1 | 50 | 40 | 29 | 40 | 1 | 9.9 |
| Example 8 | 0.25 | 1 | 25 | 40 | 29 | 40 | 1 | 5.0 |
| Example 9 | 0.7 | 0.5 | 140 | 40 | 29 | 40 | 1 | 13.9 |
| Example 10 | 0.5 | 0.5 | 100 | 40 | 29 | 40 | 1 | 9.9 |
| Example 11 | 0.25 | 0.5 | 50 | 40 | 29 | 40 | 1 | 5.8 |
| Example 12 | 0.025 | 0.5 | 5 | 40 | 29 | 40 | 1 | 0.5 |
| Example 13 | 0.14 | 0.1 | 140 | 40 | 29 | 40 | 1 | 2.8 |
| Example 14 | 0.05 | 0.1 | 50 | 40 | 29 | 40 | 1 | 1.0 |
| Example 15 | 0.025 | 0.1 | 25 | 40 | 29 | 40 | 1 | 0.5 |
| Example 16 | 0.25 | 0.3 | 83 | 30 | 45 | 40 | 0.75 | 5.8 |
| Example 17 | 0.25 | 0.3 | 83 | 80 | 3 | 40 | 2 | 1.7 |
| Example 18 | 0.025 | 0.65 | 4 | 40 | 29 | 40 | 1 | 0.5 |
| Example 19 | 0.6 | 0.3 | 200 | 60 | 6 | 40 | 1 | 7.9 |
| Example 20 | 0.44 | 0.3 | 147 | 40 | 29 | 40 | 1 | 8.7 |
| Example 21 | 0.5 | 0.3 | 167 | 40 | 29 | 40 | 0.63 | 9.9 |
| Example 22 | 0.55 | 0.3 | 183 | 40 | 29 | 40 | 1 | 10.9 |
| Example 23 | 2 | 1 | 200 | 40 | 29 | 40 | 1 | 39.7 |
| Comparative Example 1 | 0.01 | 0.3 | 3 | 40 | 29 | 40 | 1 | 0.2 |
| Comparative Example 2 | 5 | 1 | 500 | 40 | 29 | 40 | 1 | 99.4 |
| Comparative Example 3 | 5 | 0.5 | 1000 | 40 | 29 | 40 | 1 | 99.4 |
| Comparative Example 4 | 2 | 0.5 | 400 | 40 | 29 | 40 | 1 | 39.7 |
| Comparative Example 5 | 0.01 | 0.5 | 2 | 40 | 29 | 40 | 1 | 0.2 |
| Comparative Example 6 | 2 | 0.1 | 2000 | 40 | 29 | 40 | 1 | 39.7 |
| Comparative Example 7 | 0.035 | 0.3 | 12 | 85 | 2 | 40 | 2.1 | 0.2 |

| | Outer peripheral wall heat capacity F (J/gK) | E/F (%) | Temp. difference (° C.) | Cracks | Resistance change (A) | Resistance change (B) | Highest temp. (° C.) |
|---|---|---|---|---|---|---|---|
| Example 1 | 10.9 | 73.0 | 160 | None | None | None | 110 |
| Example 2 | 10.9 | 45.6 | 155 | None | None | None | 102 |
| Example 3 | 10.9 | 18.3 | 150 | None | None | None | 102 |
| Example 4 | 10.9 | 9.1 | 150 | None | None | None | 105 |
| Example 5 | 10.9 | 4.6 | 150 | None | None | None | 112 |
| Example 6 | 36.3 | 54.8 | 158 | None | None | None | 135 |
| Example 7 | 36.3 | 27.4 | 155 | None | None | None | 110 |
| Example 8 | 36.3 | 13.7 | 150 | None | None | None | 98 |
| Example 9 | 18.1 | 76.7 | 160 | None | None | None | 113 |
| Example 10 | 18.1 | 54.8 | 155 | None | None | None | 110 |
| Example 11 | 21.2 | 27.4 | 150 | None | None | None | 100 |
| Example 12 | 18.1 | 2.7 | 150 | None | None | None | 110 |
| Example 13 | 3.6 | 76.7 | 155 | None | None | None | 106 |
| Example 14 | 3.6 | 27.4 | 150 | None | None | None | 109 |
| Example 15 | 3.6 | 13.7 | 145 | None | None | None | 119 |
| Example 16 | 10.9 | 53.2 | 155 | None | None | None | 106 |
| Example 17 | 10.9 | 15.2 | 150 | None | None | None | 101 |
| Example 18 | 23.6 | 2.1 | 150 | None | None | None | 109 |
| Example 19 | 10.9 | 73.0 | 160 | None | None | None | 112 |
| Example 20 | 10.9 | 80.3 | 165 | None | None | None | 110 |
| Example 21 | 10.9 | 91.3 | 180 | Present | None | None | 105 |
| Example 22 | 109.0 | 100 | 192 | Present | None | None | 113 |
| Example 23 | 36.3 | 109.5 | 210 | Present | Present | Small | 160 |
| Comparative Example 1 | 10.9 | 1.8 | 150 | None | None | None | 240 |
| Comparative Example 2 | 36.3 | 273.8 | — | Present | Present | Large | 180 |
| Comparative Example 3 | 18.1 | 547.7 | — | Present | Present | Large | 183 |
| Comparative Example 4 | 18.1 | 219.1 | 270 | Present | Present | Large | 168 |

TABLE 1-continued

| | | | | | | | |
|---|---|---|---|---|---|---|---|
| Example 4 | | | | | | | |
| Comparative Example 5 | 18.1 | 1.1 | 150 | None | None | None | 224 |
| Comparative Example 6 | 3.6 | 1095.3 | — | Present | Present | Large | 173 |
| Comparative Example 7 | 10.9 | 1.6 | 150 | None | None | None | 235 |

Examples 2 to 23 and Comparative Examples 1 to 7

The procedures of Example 1 were repeated except that an electrode thickness, an outer peripheral wall thickness, an electrode porosity, an outer peripheral wall porosity, an electrode heat capacity and an outer peripheral wall heat capacity in each of honeycomb structures were changed as shown in Table 1, to prepare each of the honeycomb structures. The procedures of Example 1 were repeated to measure "a temperature difference", "a heat shock resistance", "a resistance change" and "the highest temperature" of the honeycomb structure. It is to be noted that "-" in the column of "the temperature difference" indicates that it was not possible to carry out the test. The test could not be carried out, because it was not possible to can (contain) the obtained honeycomb structure in a metal case. In this case, the electrode thickness was so large that a large load was locally applied to an electrode part at the canning, and hence when the honeycomb structure was forcibly canned, the honeycomb structure was damaged. The results are shown in Table 1.

It can be seen from Table 1 that when the total of the heat capacities of the electrode parts is from 2 to 150% of the heat capacity of the whole outer peripheral wall, the honeycomb structure achieves an excellent heat shock resistance. Moreover, it is seen that "the highest temperature" is low in the honeycomb structures of Examples 1 to 23, whereas "the highest temperature" is very high in the honeycomb structures of Comparative Examples 1 to 7.

INDUSTRIAL APPLICABILITY

A honeycomb structure of the present invention can suitably be utilized as a catalyst support for an exhaust gas purifying device which purifies an exhaust gas of a car.

DESCRIPTION OF REFERENCE NUMERALS

1: partition wall, 2: cell, 3: outer peripheral wall, 4: honeycomb structure part, 5: side surface, 11: one end surface, 12: the other end surface, 21: electrode part, 21a: one end portion of electrode part, 21b: the other end portion of electrode part, 21X: center portion, 21Y: extended portion, 22: electrode terminal projecting portion, 22a: base, 22b: projection, 23: conductor, 100, 200, 300, 400 and 500: honeycomb structure, O: center, α: center angle, and θ: angle of 0.5 time the center angle.

The invention claimed is:
1. A honeycomb structure comprising:
a tubular honeycomb structure part having porous partition walls with which a plurality of cells extending from one end surface to the other end surface are formed to become through channels of a fluid, and an outer peripheral wall positioned on an outermost periphery; and
a pair of electrode parts arranged on a side surface of the honeycomb structure part,
wherein an electrical resistivity of the porous partition walls and the outer peripheral wall of the honeycomb structure part is from 1 to 200 Ωcm,
each of the pair of electrode parts is formed into a band-like shape extending in a direction in which the cells of the honeycomb structure part extend,
in a cross section perpendicular to the cell extending direction, the one electrode part in the pair of electrode parts is disposed opposite to the other electrode part in the pair of electrode parts via the center of the honeycomb structure part, and
a total of heat capacities of the pair of electrode parts is from 2 to 150% of a heat capacity of the whole outer peripheral wall.
2. The honeycomb structure according to claim 1, wherein the total of the heat capacities of the pair of electrode parts is from 2 to 80% of the heat capacity of the whole outer peripheral wall.
3. The honeycomb structure according to claim 1, wherein a thickness of each of the pair of electrode parts is from 0.025 to 1.0 mm.
4. The honeycomb structure according to 2, wherein a thickness of each of the pair of electrode parts is from 0.025 to 1.0 mm.
5. The honeycomb structure according to claim 1, wherein a porosity of each of the pair of electrode parts is from 30 to 80%.
6. The honeycomb structure according to claim 2, wherein a porosity of each of the pair of electrode parts is from 30 to 80%.
7. The honeycomb structure according to claim 1, wherein an electrical resistivity of the electrode part is from 0.01 to 100 Ωcm.
8. The honeycomb structure according to claim 2, wherein an electrical resistivity of the electrode part is from 0.01 to 100 Ωcm.
9. The honeycomb structure according to claim 3, wherein an electrical resistivity of the electrode part is from 0.01 to 100 Ωcm.
10. The honeycomb structure according to claim 4, wherein an electrical resistivity of the electrode part is from 0.01 to 100 106 cm.
11. The honeycomb structure according to claim 5, wherein an electrical resistivity of the electrode part is from 0.01 to 100 Ωcm.
12. The honeycomb structure according to claim 6, wherein an electrical resistivity of the electrode part is from 0.01 to 100 Ωcm.
13. The honeycomb structure according to claim 1, wherein a conductor having an electrical resistivity lower than that of the electrode part is disposed on the surface of the electrode part.
14. The honeycomb structure according to claim 1, wherein the outer peripheral shape of the electrode part is rectangular with curved corner portions.

* * * * *